(12) United States Patent
Smith

(10) Patent No.: US 10,703,150 B2
(45) Date of Patent: Jul. 7, 2020

(54) ADJUSTABLE SAFETY CHAIN ATTACHMENT FOR TRAILERS

(71) Applicant: Fred P. Smith, Alpine, UT (US)

(72) Inventor: Fred P. Smith, Alpine, UT (US)

( * ) Notice: Subject to any disclaimer, the term of this patent is extended or adjusted under 35 U.S.C. 154(b) by 190 days.

(21) Appl. No.: 16/127,222

(22) Filed: Sep. 10, 2018

(65) Prior Publication Data

US 2019/0077204 A1   Mar. 14, 2019

Related U.S. Application Data

(60) Provisional application No. 62/556,547, filed on Sep. 11, 2017.

(51) Int. Cl.
*B60D 1/28*   (2006.01)
*B60D 1/18*   (2006.01)
*B60D 1/06*   (2006.01)

(52) U.S. Cl.
CPC ............ *B60D 1/187* (2013.01); *B60D 1/06* (2013.01); *B60D 1/28* (2013.01)

(58) Field of Classification Search
CPC ............ B60D 1/28; B60D 1/187; B60D 1/06
See application file for complete search history.

(56) References Cited

U.S. PATENT DOCUMENTS

| 2,937,885 | A | * | 5/1960 | Skow | B60D 1/28 280/457 |
|---|---|---|---|---|---|
| 3,265,407 | A | * | 8/1966 | Conn | B60D 1/28 280/457 |
| 3,608,931 | A | | 9/1971 | Kerckhove et al. | |
| 3,724,875 | A | | 4/1973 | Hillman | |
| 3,739,432 | A | * | 6/1973 | Sander | B60D 1/167 24/582.13 |
| 3,869,148 | A | | 3/1975 | Iehl | |
| 3,964,767 | A | | 6/1976 | Williams | |
| 4,180,281 | A | * | 12/1979 | Tertinek | B60D 1/28 280/457 |
| 4,266,800 | A | * | 5/1981 | Hawkins | B60D 1/167 280/480 |
| 4,428,596 | A | | 1/1984 | Bell et al. | |
| 5,072,964 | A | | 12/1991 | Schule | |
| 5,362,084 | A | | 11/1994 | Edwards | |
| 5,732,967 | A | * | 3/1998 | Behling | B60D 1/28 280/457 |
| 5,918,896 | A | | 7/1999 | Jenkins, Jr. | |
| 6,179,317 | B1 | | 1/2001 | Hurst et al. | |

(Continued)

*Primary Examiner* — Tony H Winner
(74) *Attorney, Agent, or Firm* — Angus C. Fox, III

(57) ABSTRACT

A system for attaching a safety chain between a tow vehicle and a trailer, said system including: at least one, but preferably two safety chains permanently attached to the trailer, each safety chain having first and second ends which are interconnected by interlocking chain links, with the first end secured to a releasable attachment for attaching the first end to the tow vehicle; and a locking/unlocking mechanism on each safety chain that is permanently attached to the trailer, and that releasably locks its respective safety chain so that a desired working length of that that safety chain can be provided, where the working length is measured between the locking/unlocking mechanism and the first end. The system provided optimum connection between the tow vehicle and the trailer in the event of a primary decoupling.

23 Claims, 16 Drawing Sheets

(56) References Cited

U.S. PATENT DOCUMENTS

| | | | |
|---|---|---|---|
| 6,279,939 B1 * | 8/2001 | Austin | B60D 1/18 |
| | | | 280/432 |
| 6,382,657 B1 | 5/2002 | Lynn et al. | |
| 6,581,952 B1 | 6/2003 | MacKarvich | |
| 6,644,679 B1 | 11/2003 | Warren | |
| 6,971,661 B1 | 12/2005 | MacKarvich | |
| 7,963,543 B2 | 6/2011 | Green | |
| 9,079,465 B1 * | 7/2015 | Sanftleben | B60D 1/58 |
| 2006/0006625 A1 * | 1/2006 | Cunningham | B60D 1/28 |
| | | | 280/493 |
| 2014/0131978 A1 * | 5/2014 | Sutton | B60D 1/58 |
| | | | 280/504 |
| 2015/0306930 A1 * | 10/2015 | Olson | B60D 1/28 |
| | | | 280/457 |
| 2017/0303930 A1 * | 10/2017 | Haller | A61B 17/12013 |
| 2018/0257444 A1 * | 9/2018 | Hack | B60D 1/52 |

\* cited by examiner

ADJUSTABLE SAFETY CHAIN ATTACHMENT FOR TRAILERS

FIELD OF INVENTION

The invention relates, generally, to adjustable attachments of safety chains to trailers and, more particularly, attachments that allow easy adjustment of the length of the safety chains coupled between a tow vehicle and a trailer. The invention allows a trailer manufacturer or user to install safety chains on a trailer such that they are permanently attached to the trailer and yet are adjustable in length on the trailer. The invention also provides a convenient place to store extra chain to keep it from dragging on the ground or damaging the towed vehicle. The invention applies to ball and coupler hitches, fifth wheel hitches, gooseneck hitches, pintle hitches and the like. Such easy adjustment increases the likelihood that the chains will be properly adjusted. In the event the primary trailer coupling fails, properly adjusted safety chains greatly increase the ability to control the trailer, are less likely to fail, are more likely to hold the tongue off the ground, are more likely to keep the trailer from swinging from side to side, are more likely to keep the trailer from ramming into the back of the tow vehicle and overall greatly increase the safety of pulling a trailer.

BACKGROUND OF THE INVENTION

Every year many people are killed and many more injured by runaway trailers; trailers that become completely decoupled from the tow vehicle. Runaway trailers are also responsible for large amounts of property damage every year. Primary decoupling occurs when the coupler on the trailer becomes detached from the ball, pintle hook or $5^{th}$ wheel on the tow vehicle. In most states, state law requires the use of safety chains as a secondary precaution against complete decoupling of the trailer from the tow vehicle in the event the primary coupling fails. Each state has its own laws for trailer safety chains. The state laws are anything but standard and vary considerably from state to state. This can make is difficult for trailer manufacturers to provide safety chains capable of meeting all the state laws. Some of the state laws require that safety chains: have no more slack than necessary, have sufficient strength to control the trailer in the event of a primary decoupling, have strength at least equal to the weight of the loaded trailer, prevent the tow bar from dropping to the ground in the event of a primary decoupling, be crossed under the tongue, may not use the same fasteners as the ball or coupling, cannot be welded to the trailer, must be attached one on each side of the trailer and must meet DOT and SAE standards. Some states do not allow cables in the place of safety chains.

Trailer safety standards for safety chains promulgated by such organizations as the Society of Automotive Engineers (SAE) similarly advocate: two safety chains, each chain having a strength greater than the GVWR of the trailer, the safety chains being permanently affixed-one on each side of the trailer tongue, the two safety chains being crossed under the trailer tongue with about the same slack, the safety chain having no more slack than necessary for turning.

Each of these requirements has a basis in increasing towing safety. In theory, the objective of having safety chains is to be able to maintain the connection between the towing vehicle and the trailer so that both vehicles can safely come to a stop should the primary coupling of the trailer to the tow vehicle fail. For some requirements, the connection between the requirement and the objective is easy to see, such as the chains having sufficient strength to control the towed vehicle in the event of a primary decoupling. The connection of other requirements to the objective is not quite as clear. For instance, crossing the chains under the tongue is supposed to allow the chains to cradle the tongue on top of the chains in the event of a primary decoupling and prevent the tongue from dragging on the ground. Crossing the chains also minimizes the slack required when turning. Minimizing the slack (actually a separate requirement in some states and standards) may keep the tongue from hitting the ground (also a separate requirement in some states and standards) in the event of a primary decoupling. Keeping the tongue from hitting the ground in the event of a primary decoupling allows better control of the trailer as the tongue will not have nearly the tendency to whip side to side, hit road obstacles such as cracks and expansion joints and will reduce the possibility of the trailer ramming into the tow vehicle if the tow vehicle stops faster than the towed vehicle. Additionally, if the tongue does not hit the ground, the safety chains and their connections are much less likely to get ground off thereby reducing the possibility of the trailer becoming completely detached from the tow vehicle. This is also a good safety reason to have the chains attached to the sides of the trailer. Even though some states do not allow them, safety cables (not chains) have also been used for the secondary coupling from the trailer to the tow vehicle. It is very difficult for cables to meet the requirement of no more slack than necessary and keeping the tongue from hitting the ground as will be discussed subsequently. Unless specifically separately designated, deficiencies in the prior art would apply equally to "safety chains" or "safety cables" regardless of which term is used.

Despite regulations and laws designed to prevent runaway trailers, there are still a substantial number of trailers that become completely decoupled from the tow vehicle. The inventor has consulted as an expert in numerous cases where complete decoupling of the trailer has occurred. As a result of misapplication of safety chains, many decouplings have happened and will continue to happen in the foreseeable future.

There are several reasons that primary decoupling occurs including: the coupler was not latched on the ball in the first place; the coupler was latched, but was sitting on top of the ball; the size of the ball did not match the size of the coupler (e.g. a 2" ball used with a 2⅝" coupler); the ball comes loose from the ball mount; the ball mount comes out of the receiver as a result of not being properly pinned in; the kingpin is not properly locked in the $5^{th}$ wheel hitch or hitch parts are overloaded and break.

Secondary decoupling of the safety chains also occurs for several reasons including: improper, non-gated or weak tow vehicle attachment hooks; nuts and bolts holding a chain end to itself that come loose or fail; chains that have been ground thin as a result of being too long and dragging on the road and then break when put under load; chains or their attachments that get ground off as a result the trailer tongue dragging on the road; chains that break as a result of the trailer whipping back and forth due to excessive safety chain length; reduced strength due to twisting of the chains that is sometimes done to make them shorter; or improperly sized safety chains for the weight of the trailer.

After examining hundreds of trailer safety chains attached to tow vehicles, it has become clear that many, if not most, are attached in a very ineffective manner that could allow for secondary decoupling and that would not meet all state laws and applicable standards. In most cases, the length of the safety chains allow trailer tongue to hit the ground and would allow the trailer to move so far forward in the event of primary decoupling that the trailer can hit the tow vehicle. Many safety chains are attached to the bottom of the trailer tongue.

Although standards and state laws state that chains should be attached to the sides of the trailer tongue, a number of trailer manufacturers have chain attachments located on the bottom of the trailer tongue. This is dangerous when a trailer primary decoupling occurs because these types of attachments have been known to be ground off or allow the chain itself to be ground off as the tongue comes in direct contact with the road at highway speeds. When attached to the bottom of the trailer tongue, chain attachments may be the first point of contact with the road. Even when chains or cables are "protected" by a tube or other device that the cables go through, testing by the inventor has shown that these devices can easily be ground off as they contact the road, exposing the chain or cable to the possibility of being ground off. For example, most grinding wheels operate between 4,000 and 6,500 surface feet per minute, by comparison, 60 miles per hour is 5280 surface feet per minute. When a trailer tongue hits the ground it is roughly equivalent to applying the tongue weight to a gigantic grinding wheel. The results are surprisingly violent, taking only seconds to grind off chains, cables or inches of steel.

Again, many states have laws that state that chains should only have enough slack between the trailer and towing vehicle to allow for the proper turning of tow vehicle and trailer. Trailers usually come with chains or cables that are way too long. This is because the trailer manufacturer makes the trailer chains long enough to be able to attach to many generic tow vehicles with the assortment of hitches used. Some vehicles may have lifts where the chain has to attach to the tow vehicle several feet above the ground. Other smaller tow vehicles may have the safety chain attachment only inches off the ground. There are also different receivers and ball mounts that also change the length chain needed for optimum attachment. In addition, safety chains and cables are not sold (as an aftermarket device) in small length increments so as to have optimum length when used with a specific tow vehicle and trailer. The problem is further exacerbated when multiple tow vehicles are to be used with the same trailer (i.e. companies that rent trailers, companies or individuals that own multiple tow vehicles that might tow the trailer). Many times this means a chain that is too long and drags on the road while driving. Prolonged dragging grinds material off of the chain links and can severely reduce the strength of the safety chains from their rated capacity. Excess slack in the chain can cause a substantial increase in the force required to keep the trailer attached to the tow vehicle in the event of a primary decoupling as the additional length allows the decoupled trailer to swing from right to left behind the tow vehicle. This not only increases the stress on the safety chains but also can cause the tow vehicle to lose control, particularly in instances where the trailer has a high rotational moment of inertia (heavy, long trailers) and the tow vehicle has a light rear axle weight when the trailer is not attached (i.e. pickup trucks). Chains that are too short cannot be attached to the tow vehicle and thus provide no additional security in the event of a primary decoupling. Thus, having safety chains that are either too long or too short results in very dangerous towing conditions.

Sometimes in order to keep the chains from dragging on the ground the chains are twisted many times in order to shorten them. This also weakens the chains. Testing done by the inventor has shown that the chain strength can be decreased by as much as 75% as the links are subject to bending in addition to the normal tensile load as a result of being twisted. Other creative, untested methods of shortening the safety chains may have similar or worse problems A number of trailer manufacturers have opted to use coiled safety cables in lieu of safety chains because the coil tension shortens the end to end length of the cable, yet the cable can extend to a much longer length. In most cases this eliminates dragging while allowing the safety cable to extend to be able to attach to the tow vehicle and extend during turns. While the ability to coil the cable to shorten it is advantageous for keeping the cables off the ground while towing, in the event of primary decoupling the coiled cable can and will extend to its full length and, in almost every instance, allows the trailer tongue to hit the ground, allows the trailer to swing side to side, and perhaps even allows the trailer to hit the tow vehicle when coming to a stop. Cables are especially susceptible to being ground off should they or their attachments ever come in contact with the ground. Because they are coiled to have extra length on purpose, they virtually never meet the state laws and standards that require them to be "no longer than necessary." They are virtually never the optimum length (just long enough to allow turns) and thus are a poor method of secondary coupling. Further, they are inferior as they do not lend themselves to being able to change the extended length.

There are a number of patents aimed at addressing the problem of safety chains that are too long and would thus drag on the ground. Much of the prior art has attempted to use safety cables as the solution. Two examples are U.S. Pat. Nos. 6,581,952 and 6,971,661 both of which utilize springs to take up extra slack in a cable. Although this generally keeps the cable off the ground due to the excess slack problem, once the trailer is decoupled the safety cables are pulled to their full length with the attendant safety issues with excessively long cables discussed above. With the housings described in the patent attached to the bottom of the tongue, these systems would be susceptible to being ground off on the road causing the trailer to lose its secondary connection with the towing vehicle. U.S. Pat. No. 5,072,964 also uses a cable that is attached from the trailer directly to the ball. As discussed above one of the reasons for primary decoupling is the ball coming lose. Attaching a cable to the ball would provide no additional secondary decoupling protection for this primary decoupling mode and would not comply with many state laws that require the secondary coupling not to use any of the attachments used by the primary coupling. U.S. Pat. No. 3,608,931 utilizes a chain hook on one end of the chain. A mid portion of the chain is attached to the tow vehicle and then the chain is looped back on itself and the chain hook attached to the chain. A latch keeps the chain hook from disengaging the chain after it has been attached. The downfall of this design is that most times, the attachment holes on the tow vehicle to attach the safety chains to are too small to pass a chain hook through. Therefore, one would have to take the hook off of the chain, pass the chain through the attachment hole and then reattach the hook for this to be used with most receivers. As the hook is generally attached with tools, this is very time consuming and therefore less likely to be done properly. Further, as will be discussed in more detail subsequently, the length of the chain from attachment on the trailer to attachment on the tow vehicle should be minimized to provide the best chance of cradling the tongue in the event of primary decoupling. If the attachment distance is kept very short, as it should be, there is not much latitude for chain length adjustment as done in this patent. Another example is U.S. Pat. No. 3,724,875 which has a cable attached to the bottom of the trailer tongue on a horizontal pulley. This design accounts for the challenges presented when turning. It does not offer the necessary protection in the event of primary decoupling as it is mounted to the bottom of the tongue which is not in accord with the SAE standard and many state laws that require the attachment to be on the side rails of the trailer.

Thus, there is a long felt need for a simple, safe, fast and easy way of properly adjusting the length of safety chains to accommodate the many combinations of tow vehicles, trailers and primary couplings. It is also desirable to have a safety chain attachment system that can be attached to the trailer by the manufacturer that allows the end user to meet all the trail chain laws of their state without having to make substantial changes to the safety chain system. The need to be able to easily and safely adjust the length of safety chains for $5^{th}$ wheel and gooseneck trailers is similar. The present invention overcomes the deficiencies in the prior art.

SUMMARY OF THE INVENTION

In view of the above stated problems with the prior art, there exists an unresolved need for a trailer safety chain attachment that allows the safety chain to be permanently attached to the trailer and yet to be able to change the working length quickly, securely and easily to properly fit virtually all combinations of tow vehicles, trailers and couplings. The instant invention allows a safety chain to be permanently attached and allows the user to quickly, easily and properly adjust the length of the safety chain to provide secure, secondary coupling of the trailer to the tow vehicle. "Permanently attached" as used throughout this specification, including the claims, means requiring a tool to detach. When used on a ball and coupler type trailer the current best practice for use of an embodiment of the present invention attaches the safety chain to the trailer as far forward as practical. The present invention allows for easy adjusting of the length of the safety chains on the trailer to the shortest, most advantageous length, storing any excess chain in a manner to keep the chain from dragging on the ground. As such, in the event of a primary decoupling, the chains will more likely cradle the trailer tongue, keep the tongue from dragging on the ground, more effectively control trailer sway, keep the trailer from ramming into the back of the tow vehicle and consequentially reduce property damage and save lives.

In one embodiment, the invention consists of a sleeve, permanently attached to the trailer, made with a cross sectional geometry designed to orient incoming chain links in such a manner that the opening in every other chain link will be oriented to receive a pin that engages a through hole in the sleeve and the properly oriented chain link. The sleeve may be of any desired length depending on the embodiment. In one embodiment, the cross sectional geometry of the sleeve is similar to a clover shape.

The though hole in the sleeve is generally perpendicular to the longitudinal axis of the sleeve. The long axis of the sleeve being defined as the axis of the sleeve in the direction the chain slides. The through hole may go through one or both sides of the sleeve. A safety chain can be pulled through the sleeve in either direction without having to manually orient incoming links or manually feed links into the sleeve. The shape of the sleeve is such that at least every other link that is drawn into the sleeve gets properly oriented such that the plane of the link is either substantially parallel or substantially perpendicular to the through hole axis.

Further, the sleeve is designed such that pulling on the chain extending from one side of the sleeve produces a moment or force couple on the next link to enter the other side of the sleeve such that it is rotated into proper alignment to enter the sleeve. In other words, when the chain is hanging down from the end of the sleeve, the long axis of the next link to enter the sleeve is almost perpendicular to the axis of the sleeve (assuming the axis of the sleeve is horizontal) and must be rotated up so that it is substantially parallel to the axis of the sleeve so that the width of the link can enter the sleeve. As the chain is being pulled through the sleeve every other link aligns with the through hole in the sleeve. Thus, the safety chain is adjustable in length increments of two chain pitches. A pin is inserted in the though hole in the sleeve and into the properly oriented chain link, locking that link in the sleeve and fixing the working length of the safety chain. In some embodiments the pin may be inserted in the through hole in one side of the sleeve, through the lock link and through a through hole in the other side of the sleeve. A hairpin cotter can then be inserted in a cross hole in the end of the pin that assured that the pin cannot come out of the through holes and lock link of the chain. A lanyard may attach the hairpin cotter pin to the sleeve pin to keep it from getting lost. Working length of the safety chain is defined as the length from where the safety chain is releasably locked to the trailer to the tow vehicle attachment end of the safety chain. One need not have the alignment perfect in order to insert the pin as will be discussed subsequently.

On the first end of the safety chain is, preferably, a gated hook that is permanently attached to the safety chain. As used in this specification including the claims, when referring to the instant invention, hook means any safety chain tow vehicle attachment known to those of skill in the art. The receiver usually comes with two chain attachment holes, one on each side of the receiver. Attaching the first end of each safety chain from the trailer to the tow vehicle is accomplished by crossing the safety chains under the tongue and hooking the first end of each safety chain to the chain attachment hole on the opposite side of the receiver. After attaching the chain to the trailer, if there is too much slack in the chain, the pin can be removed from the sleeve and the user can pull on the second end of the safety chain, shortening the chain as each successive link is pulled into the sleeve. The pin is then reinserted to lock the chain in place. The chain is left just loose enough that it will miss any protrusions on the bottom of the trailer or hitch when turning the tow vehicle.

The length of the sleeve also assists in longitudinal alignment of an opening in the safety chain with the through hole in the sleeve. The length of the sleeve is preferably set to approximately an odd number of chain pitches minus two chain wire diameters. With a sleeve of approximately this length, the chain on both sides of the sleeve hangs down with an odd number of links substantially inside the sleeve. If a chain link opening is slightly out of alignment with the through hole in the sleeve, the link going into the sleeve on one end or the other will be rotated up with its long axis not parallel or perpendicular to the sleeve axis. The weight of the chain will pull down on this link which rotates against the end of the sleeve pulling the chain out of the sleeve. This further aligns an opening of a chain link longitudinally with the through hole in the sleeve. The chain will continue to move out until either the rotated chain link axis is vertical or the angles of the axes of the chain links adjacent each end of the sleeve have substantially the same angle with respect to the axis of the sleeve. There would be some small difference due to friction of the chain in the sleeve. The link whose opening aligns with the through hole in the sleeve into which the pin is inserted is called the lock link in this specification. As a result of this alignment, the user does not have to check by looking through the hole to see if the lock link is properly aligned. With the lock link more or less aligned with the through hole in the sleeve, a pin can be inserted through the top hole in the sleeve, through the lock link and through the hole in the other side of the sleeve to lock the chain in place. Alignment does not have to be perfect in order to insert the pin as the rounded ends of the vertically oriented chain links on either side of the lock link act as ramps to pull the chain slightly one way or the other to allow the pin to be inserted into the horizontally oriented lock link. Alignment is also accommodated by the chamfered or rounded tip of the pin that is being inserted into the hole.

The pin may also have a bend toward the middle of the pin. This bend makes it more ergonomic to use the upper portion of the pin as a handle to insert the pin into and retract the pin out of the sleeve. The bend may also serves as a stop when inserting the pin into the sleeve. As the bend is less than 90°, any excess chain can be stacked on the exposed upper (handle) portion of the pin. When the trailer is not connected to the tow vehicle, this upper (handle) portion of the pin also provides a convenient storage location for the tow vehicle attachment on the end of the chain, keeping them off of the ground and making them readily available to hook to the tow vehicle. The tow vehicle attachment, which may be a gated hook, is permanently attached to one end of the safety chain. As stated earlier, "permanently attached" as used in the specification and claims means that a tool would be required to detach. For instance: welding would be a way of permanently attaching one part to another; a chain link would be permanently attached to a clevis with a clevis pin where the clevis pin is held in the clevis with a bent cotter pin through a transverse hole in the end of the clevis pin (assuming the cotter pin would require tools to straighten it sufficiently to remove it); bolts with locking nuts such as nylocks or nuts with prevailing torque threads would permanently attach to an item or permanently attach multiple items (again assuming that the nuts require sufficient torque to remove them that they cannot be removed without using a tool).

In some embodiments, the end of the safety chain opposite the hook can be affixed to the sleeve pin using any number of known methods. For instance, it may be welded or it may be inserted into a link and held there between an upset in the pin and a push washer. It may also be held in the link between two push washers, a welded washer and a push washer or two welded washers. When the pin is used as a stop to keep the chain from coming out of a sleeve attached to the trailer, the attachment is stronger when the pin is inserted in other than the last link as it must bend around the width of a chain link rather than just the wire diameter. Attaching the pin to the safety chain in this manner accomplishes several purposes. First, with the hook permanently attached to the other end of the safety chain, the chain and pin connected are also connected to the trailer to reduce the likelihood that either the pin or the chain will get lost or stolen. Second, should the user forget to properly adjust the safety chains by inserting the pin through the hole in the sleeve and into the chain, the chain is still permanently attached to the trailer (the sleeve requires tools to remove and the chain cannot be slid out of the sleeve without removing either the hook on one end or the pin on the other, both of which require tools to remove). The chain may slide though the sleeve, but only up to the point where it will be stopped when the pin hits the end of the sleeve. While the length of chain when it has completely slid though the sleeve toward the tow vehicle would likely not be optimal, it would work as well as other chains that are too long.

While a pin inserted into a through hole in a sleeve engaging the opening of a chain link is used in one embodiment to lock the safety chain in place in the sleeve, one of ordinary skill in the art would understand that other locking/unlocking means for the chain can also be used such as bolts, hooks, clamps, clevises, d-rings, etc. Likewise, in one embodiment, permanently attaching the chain is accomplished by sliding the chain through an orifice permanently attached to the trailer and adding a stop to each end of the chain to keep it from coming out of the orifice. In other embodiments, the chain is permanently affixed to the trailer at one end by means known to those of skill in the art, such as bolting, welding, attaching to a plate with clevis, attaching to plates with a clevis pin and cotter key, inserting the chain through an orifice permanently attached to the trailer and then permanently connecting the chain on both sides of the orifice together, etc. The present invention thus makes it possible to properly, quickly and safety adjust the working length of a safety chain on a trailer, yet still have it permanently attached to the trailer.

There are many different manufacturing methods that could be used to make the sleeve depending on its configuration. One embodiment is made using a stamping and forming process. However, the chain locking/unlocking mechanism of different embodiments could also be made using casting, extrusion, cutting, welding, or any other known manufacturing processes without departing from the invention. It is further desirable that the sleeve when installed on a trailer have no pockets where water can become entrapped, thus exacerbating corrosion issues. The shorter the sleeve the easier it is to paint the interior, thus also increasing corrosion resistance.

In one implementation of the invention, a sleeve would be attached to each of the vertical sides of the trailer tongue, with the length of the sleeve parallel to the trailer tongue. This may be done by any known method (i.e. welding, bolting, etc.) The sleeve should be attached as close to the coupler (front end of the trailer) as possible. As the sleeve mounting distance from the coupler and thus the tow vehicle increases, the chain working length necessarily increases as well, decreasing the likelihood that the safety chains will cradle the tongue and prevent it from contacting the ground or prevent the towed vehicle from colliding with the tow vehicle. When the safety chains are attached too far back behind the coupler, it does not matter how tight the crossed chains are under the coupler, if the trailer's primary coupling becomes decoupled, the tongue will fall to and drag on the ground. To illustrate, if the chain attachment point on the trailer is 4 feet back behind the coupler and the coupler when coupled to the ball is only 2 feet off the ground, when the coupler comes off of the ball the trailer will move forward and downward with respect to the ball until the trailer tongue hits the ground. If this occurs, the trailer tongue can be the cause of grinding the crossed chains on the road and their subsequent failure. The invention can also be mounted on other types of trailers (i.e. gooseneck, $5^{th}$ wheel, etc.) to allow the length of safety chains on those trailers to be easily and confidently changed. The present invention need not be mounted horizontally in order to achieve many of the benefits of the present invention.

As will be shown subsequently, there are other shapes and ways that can be used without deviating from the scope of the invention.

BRIEF DESCRIPTION OF THE DRAWINGS

The forgoing features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through the use of the accompanying drawings in which:

DETAILED DESCRIPTION OF THE INVENTION

The invention will now be described in detail with reference to the attached drawing FIGS. 1 through 24. In the description of the invention herein front, rear, left, right, up and down refer to directions from the perspective of the driver of the tow vehicle when looking forward. Vertical generally means perpendicular to the ground. Lateral refers to side to side direction of the trailer and tow vehicle. A horizontal plane refers to a plane oriented generally parallel to the direction of travel of the trailer; this will usually be a plane parallel to the ground the tow vehicle and trailer operates on. A vertical plane refers to a plane perpendicular to the horizontal plane. For purposes of this specification a horizontal chain link 133 is one that lies in a horizontal plane and a vertical chain link 134 is one that lies in a vertical plane; chain pitch is the longest inside distance across a single chain link; chain wire diameter of a chain is the cross-sectional diameter of one side of a chain link; chain width is the outside smallest dimension of a chain link; a lock link 137 is the chain link 133 that is releasably engaged to lock the working length of the safety chain 111.

Figure 1:
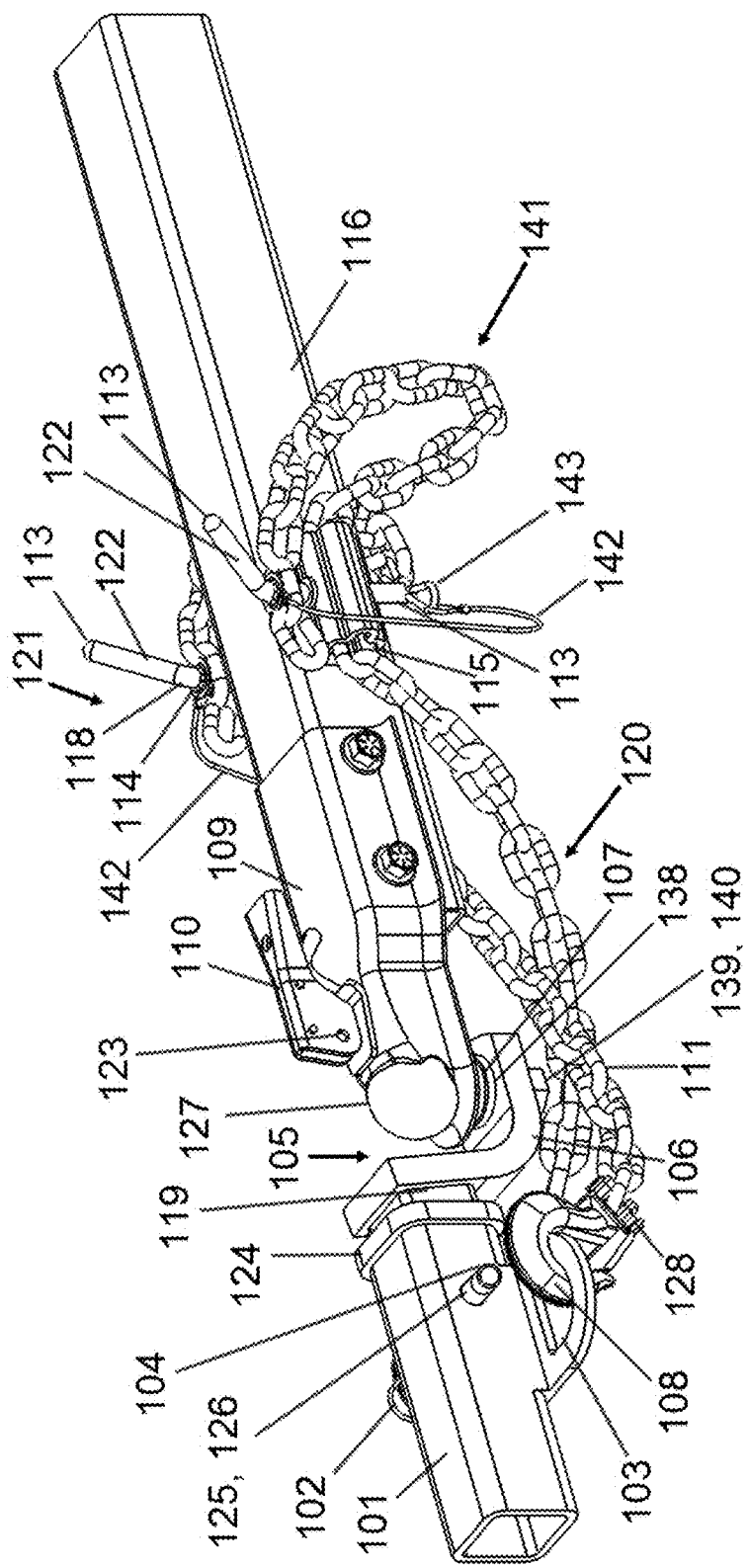
FIG. 1 is a perspective view of an apparatus in accordance with the invention, showing how the invention is used to couple a trailer to a tow vehicle.

Referring now to FIG. 1, a perspective view of an embodiment of the present invention, a trailer tongue 121 is shown as the front most part of a trailer (the entirety of which is not shown). The trailer tongue may be a component of various types of trailers (boat, RV, horse, enclosed, open, etc.). A trailer may be coupled to a towing vehicle (not shown) in the following way. A receiver 101 is fixedly attached to the rear of a towing vehicle by way of welding, bolts, rivets or other ways well known in the art. The receiver 101 generally has a female tubular portion that is capable of receiving within it the shank 119 of ball mount 105. The receiver is most commonly sized to accept ball mount shanks 137 measuring 2" by 2" square, although 2½ by 2½ and 1¼ by 1¼ square shanks are also used. The receiver 101 also includes an aperture 103 usually on each side of the receiver 101 for attaching the safety chains. The receiver also has a laterally extending through hole 125 in the tubular portion. A ball mount 105, also having a laterally extending through hole 126 is inserted into the receiver opening 124 until the through holes 125, 126 align with each other. The ball mount 105 is typically secured in the receiver by inserting a hitch pin 104 through the aligned through holes 125 in the receiver and the through holes 126 in the ball mount 105. A hairpin cotter pin 102 may be inserted in a hole in the end of hitch pin 104 to secure the hitch pin 104 from escaping aligned holes 125, 126 in one direction and a head or bend in the hitch pin to keep the hitch pin 104 from escaping in the other direction. The ball mount 105 can be any design known to those of ordinary skill in the art. Generally, the ball 107 may be welded to the ball mount 105, or the ball mount may have a hole 138 through which a threaded shaft of the ball 107 is inserted and which is secured to the ball mount 106 by a lock washer 139 and nut 140. The ball 107 is typically 1⅞" diameter, 2" diameter or 2 5/16" diameter. The ball mount 105 may be straight or may be offset such that the ball may be above the receiver opening 124 or below the receiver opening. Some ball mounts even allow for vertical adjustment of the ball position so that the ball height can more closely match the coupler 109 height when the trailer frame is level. Thus, different ball heights allow the trailer tongue 121 to be coupled to the tow vehicle with the trailer tongue approximately horizontal when the trailer and tow vehicle are on a flat surface.

Many trailer tongues 121 comprise a tube 116 closest to the tow vehicle. Other trailers may be of the A-frame type (not shown) where the frame rails slope inward to almost meet along the centerline of the trailer. A coupler 109 is attached to the end of the tube 116 or the tip of the A-frame (not shown) by welding, bolting or other means. The coupler can be any design known to those of ordinary skill in the art and is designed to attach to the ball 107. The coupler generally comprises a latching mechanism 110 used to lock the coupler 109 onto the ball 107 of the towing vehicle. The coupler latch 110 generally has a hole 123 through which a pin or padlock can be inserted to keep the latch from inadvertently opening. The coupler 109 properly locked onto the ball 107 serves as the primary coupling between the trailer and the towing vehicle.

There are several failure modes that can cause the primary coupling to decouple. First, the pin 104 may not have been inserted through holes 125 and 126. Second, the pin 104 may come out if, for instance, the hairpin cotter pin 102 was not installed properly. Third, if the ball mount 105 is not inserted sufficiently into the receiver 101, the pin 104 may have been installed in through holes 125 in the receiver, but not in through holes 126 in the shank 137 of the ball mount 105. Any one of these three may cause the ball mount 105 to decouple from the receiver 101 and thus the trailer from the tow vehicle. Fourth, the user may have forgotten to engage the coupler latch 110 or it may have become unlatched during use. Fifth, the coupler 109, with the latch 110 locked in place, can be on top of the ball 107 instead of latched underneath the ball. In this case, the coupler 109 does not actually latch onto the ball, but just sits on top of it. Sixth, the ball size does not match the coupler. A coupler designed for a larger ball can come off a smaller ball even if the coupler latch 110 is latched. A coupler designed for a smaller ball will sit on top of a larger ball 107, similar to failure mode five and will be incapable of latching to the ball. In the fourth, fifth and sixth failure modes the trailer may still be able to be towed but any substantial vertical acceleration of the tongue with respect to the tow vehicle will cause the coupler 109 to lift off of the ball 107. A seventh failure mode of the primary coupling is if the ball 107 comes loose from the ball mount 105. For example the nut 140 comes loose or the shank of the ball 107 fails.

Figure 3:
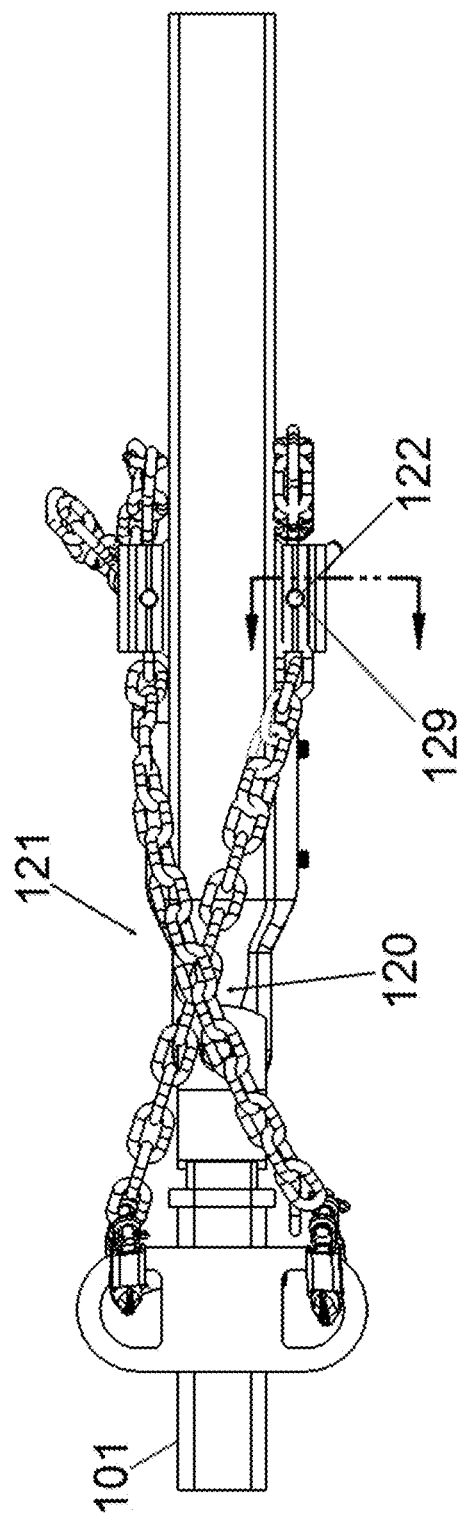
FIG. 3 is a bottom view of the apparatus in accordance with the invention showing the connection between the trailer and the tow vehicle.

Due to the number of incidents where the primary coupling fails, many states and standards require the use of a secondary coupling as a backup connection. In most instances, safety chains or cables are the means of secondary coupling where the secondary coupling is supposed to keep the trailer attached to the tow vehicle until the tow vehicle and trailer can slow down and come to a stop. Some states specifically require chains. In the present invention safety chains, not cables, are employed to form this secondary coupling as will be described. The apertures 103 on the receiver 101 are large enough to allow a clevis hook 108, S-hook or similar attaching device to attach securely to the receiver 101. Many of these attaching devices or hooks 108 have a spring loaded gate that closes so that the attaching device or hook cannot inadvertently detach from the receiver aperture 103. Chains 111 may be affixed to the attaching device or hook 108 as is commonly known in the art, such as by means of a clevis pin 128 held in by a cotter pin. Many regulations and standards require the safety chains 111 to be crossed, as best seen in FIG. 3, beneath the trailer tongue 121. The position in which safety chains are secured to the trailer tongue 121 greatly affects the efficacy of the secondary coupling. Therefore, the present invention, used for this ball/coupler type of trailer/tow vehicle coupling, attaches the chains as far forward on the trailer tongue as is reasonable, generally right behind the coupler. A coupler could also be designed that would incorporate the present invention. The present invention is designed to accommodate the variations between towing vehicles and trailers by enabling the user to adjust the length of the safety chain where it is attached to the trailer while still having the safety chain permanently attached to the trailer as required by many state regulations and standards. The following detailed description, details one application of the present invention. Other applications (i.e. $5^{th}$ wheel, gooseneck, etc.) may not have components oriented the same way as discussed below. For instance, if a sleeve type of locking/unlocking device is used with a $5^{th}$ wheel hitch, the sleeve will likely be mounted to the trailer in a more vertical position rather than the horizontal position described in the following paragraphs. The directions and orientations used in the following explanation of the instant invention are used to simplify the explanation of the instant invention and should in no way be considered limiting as to the orientation at which the instant invention may be used.

Figure 2:
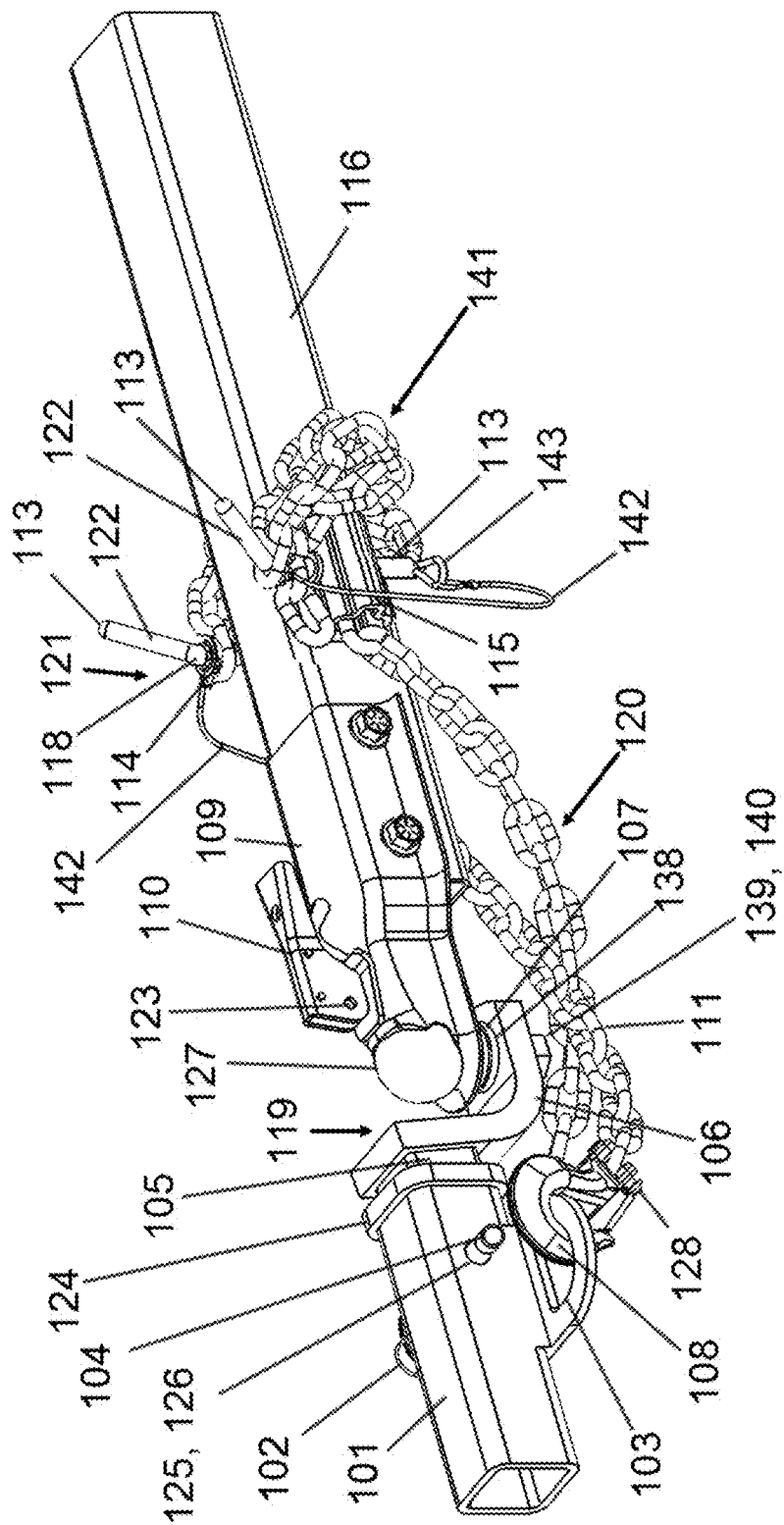
FIG. 2 is a perspective view of an apparatus in accordance with the invention showing how the invention is used to couple a trailer to a tow vehicle; and further showing stowing extra chain.

As seen in FIG. 1, sleeves 115 are affixed to the trailer tongue 121 just behind the coupler 109. The locking/unlocking mechanism 141 comprising a pin 122 and sleeve 115 that may be used to orient and lock safety chains 111 into place at a desired working length. The sleeves 115 as shown in the embodiment of FIGS. 1-3 are formed of sheet metal, though one of skill in the art would know they can be made in a variety of other ways, including, but not limited to, casting, extruding, cutting or welding. They also may be made of any of a number of materials, including steel and aluminum. One sleeve 115 is permanently attached to the vertical face on the left side of tube 116 and one sleeve 115 is permanently attached to the vertical face on the right side of tube 116. On an A-frame type trailer, the sleeves 115 would be attached on the vertical face on each side of the A-frame. Sleeves 115 may be permanently attached by any method known to one of skill in the art such as by welding, bolting, riveting, etc. They may be affixed to any substantially vertical portion of trailer adjacent the coupler 109. Many regulations and standards require the safety chains to be permanently attached (fastened) to the trailer, one on each side of the tongue.

The following description is for one locking/unlocking mechanism 141 for locking a safety chain 111 in place understanding that, in most applications, there is a substantially identical locking/unlocking mechanism 141 on the opposite side of the trailer. A safety chain 111 is installed into the sleeve 115 by sliding the chain through the cross sectional opening 117 and pulling until the desired working length of safety chain is achieved. Through holes 129 are located along the longitudinal axis of each sleeve 115 and allow for pin 122 to be inserted through sleeve 115 and into a lock link 137 of safety chain 111. As shown in FIG. 1, in some embodiments the sleeve pin 122 is inserted through the sleeve aperture 129, through the lock link 137 and through a sleeve aperture 129 on the opposite side. In many configurations of the sleeve 115, the through hole 129 is in a generally vertical direction. With pins 122 inserted into vertical holes 129 and through the lock link of safety chain 111 the safety chain is limited in how much it can slide axially in the sleeve 116, locking the safety chain 111 to a user specified working length. In some configurations a lanyard 142 connects a hairpin cotter pin 143 to the sleeve pin 122. The hairpin cotter pin 143 can then be inserted into a hole in the end of sleeve pin 122 after it has been fully inserted through the sleeve thus assuring the pin 122 cannot inadvertently the lock link 137 to be unlocked from the sleeve 115. Thus, the working length of chain between the hook 108 and where it is locked to the trailer tongue 121 by sleeve pin 122 can be user determined by pulling safety chain 111 through the sleeve 115 and locking the lock link 137 of safety chain 111 with pin 122. As seen in FIG. 2, any excess chain pulled out the end of the sleeve 115 can be stacked on top of pin 122 (the handle portion) by placing the opening of a chain link of the excess chain over the pin 122 so as to keep any portion of the safety chain 111 from dragging on the ground.

FIG. 3 shows the underside of the trailer showing the safety chain 111 attachment from the receiver 101 on one end to the trailer tongue 121 on the other. Chains 111 are attached from the receiver apertures 103 to the sleeves 115 and are preferably crossed beneath the trailer tongue 121. Crossing the chains is desirable, first because the crossed safety chains 111 pass almost directly under the ball and as such minimize the chain length required to accommodate the articulation of the trailer with respect to the tow vehicle when turning and second if the trailer tongue 121 becomes decoupled from the ball 107, the coupler 109 region of the trailer tongue 121 will more likely be cradled in the crossed chains 120 below and keep it from dragging on the ground.

Figure 4:
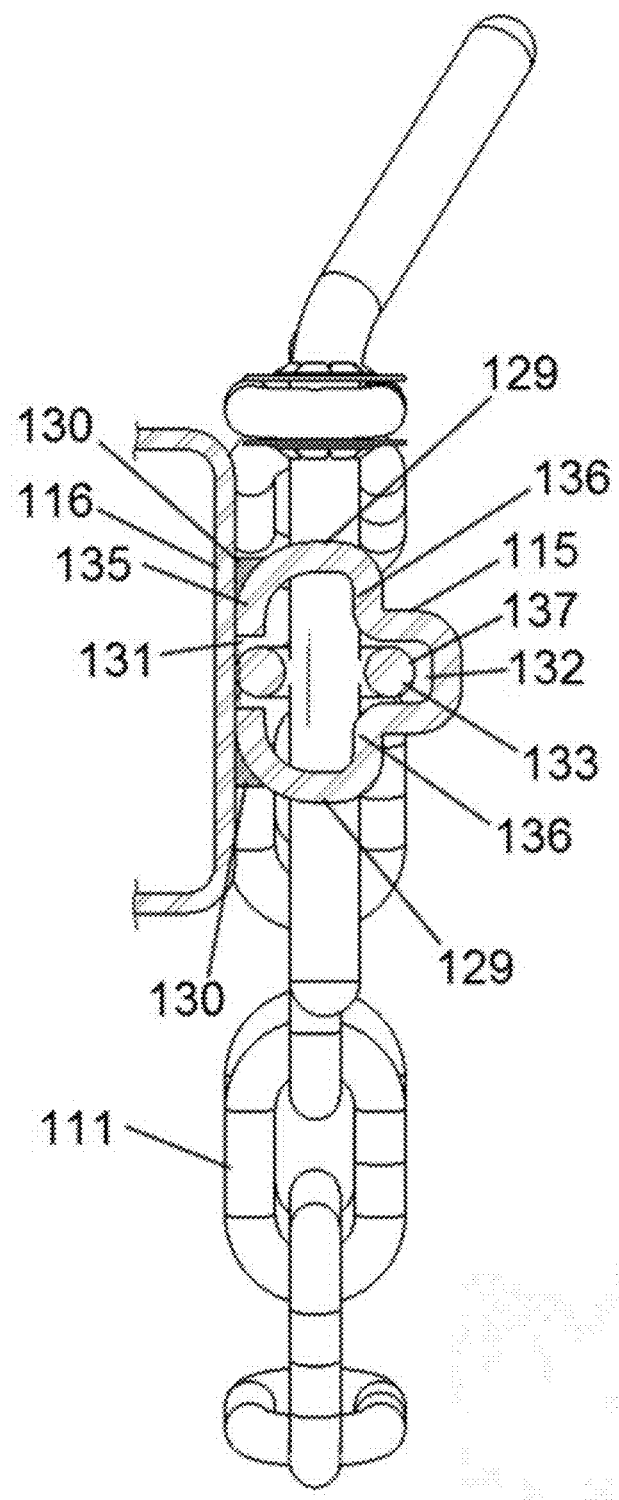
FIG. 4 is a partial cross-sectional view as shown by the section line in FIG. 2.

FIG. 4 shows a partial section view of the sleeve 115 and the vertical holes 129 and how sleeve pin 122 fits into them. The sleeve 115 as shown in this embodiment is attached to the trailer by welds 130. These welds 130 may extend the entire length of the sleeve 115 in the space between the curved feature 135 and the tube 116 or A-frame and continue over both ends of sleeve 115. This gives the welds enough strength to keep the sleeves 115 from being torn off as a result of the loads put on them when the primary coupling fails. Strength of the locking/unlocking mechanism 141 is as strong as or stronger than the minimum breaking strength of the chain. In other embodiments the sleeve is designed with additional material to be bolted along the side of the trailer tongue 121 instead of being welded. When welded, the sleeve 115 is formed of the same type of material as the tube 116 to facilitate welding.

The cross-sectional geometry of sleeve 115 provides several distinct advantages for ease of use when changing the chain length. The cross-section of sleeve 115 is such that the chain links are urged to alternatingly substantially horizontal and substantially vertical orientations as the safety chain 111 is pulled into the sleeve 115. This can be accomplished in a number of ways. Since the width across the inside of a chain link is larger than the wire diameter, each succeeding link can rotate with respect to the previous one a certain angle when the chain is twisted. For most typical safety chains that angle is approximately 30 degrees. Therefore, for optimal operation and to keep the safety chain 111 from binding as successive chain links enter the sleeve opening 115, the cross-section of the sleeve needs to straighten links to their either horizontal or vertical orientation to some degree. For instance, if the first chain link is held completely horizontal in the cross-section of sleeve 115, but the shape of sleeve 115 does nothing to urge the second link to a vertical orientation, the second link can be 30 degrees off of vertical as it enters the sleeve. If the cross-section can accommodate the second link that was supposed to be vertical but is now 30 degrees off of vertical, the third link that needs be substantially horizontal for proper pin insertion can now be 60 degrees off of horizontal as it approaches the sleeve opening 131. It is very difficult for the sleeve 115 cross-section to rotate the third link back 60 degrees as it enters the cross-section and is therefore likely to bind upon entrance into sleeve 115. In fact, for the safety chain 111 to be pulled through the sleeve without binding the sleeve entrance has to either substantially straighten each link as it enters the sleeve or accommodate the twisted link such that it does not hit the sleeve entrance 131 in a way that binds the chain as it is being pulled through the sleeve 115.

On the other hand, the rounded shape of the links make it fairly easy to have a sleeve entrance 131 that will urge a successive link back 30-40 degrees or so from a twisted position as it enters the sleeve entrance 131. Therefore, for optimal operation both links that should be horizontal and vertical should be urged to and held in their substantially horizontal and substantially vertical positions by the sleeve 115. This will now be explained with respect to the cross-section of sleeve 115 shown in FIG. 4.

The pocket feature 132 and the opening 131 hold alternating chain links 133 in a substantially horizontal orientation such that they are oriented generally perpendicular to the sleeve pin 122. Pocket feature 132 and the tube 116 also limit the horizontal lateral movement of the chain. If the horizontal link 133 tries to twist in a clockwise direction the bottom of pocket feature 132 keeps the right side of link 133 from moving downward and the end face of the upper bent end 135 keeps the left side of link 133 from moving upward. Conversely, if the link tries to rotate counterclockwise, the top of pocket feature 132 and the end face of the bottom bent end 135 keeps the link from twisting. The vertical walls 136 of the sleeve orient the vertical link 134 to a substantially vertical position. While it appears that the vertically oriented chain link 134 could rotate as it is only being held on one side by walls 136, when tension is put on the chain, the vertical link wants to stay on the centerline of the horizontal link 133. If the link were to twist clockwise, the bottom of vertical link would move to the left and that would also move the link off the centerline of the horizontal link 133. A similar movement would have to happen if the vertical link 134 is rotated counterclockwise. Therefore, with vertical walls 136 supporting one side of the vertical link, it cannot twist and stay on the centerline of horizontal link 133; this urges the link to its vertical position.

Figure 5:
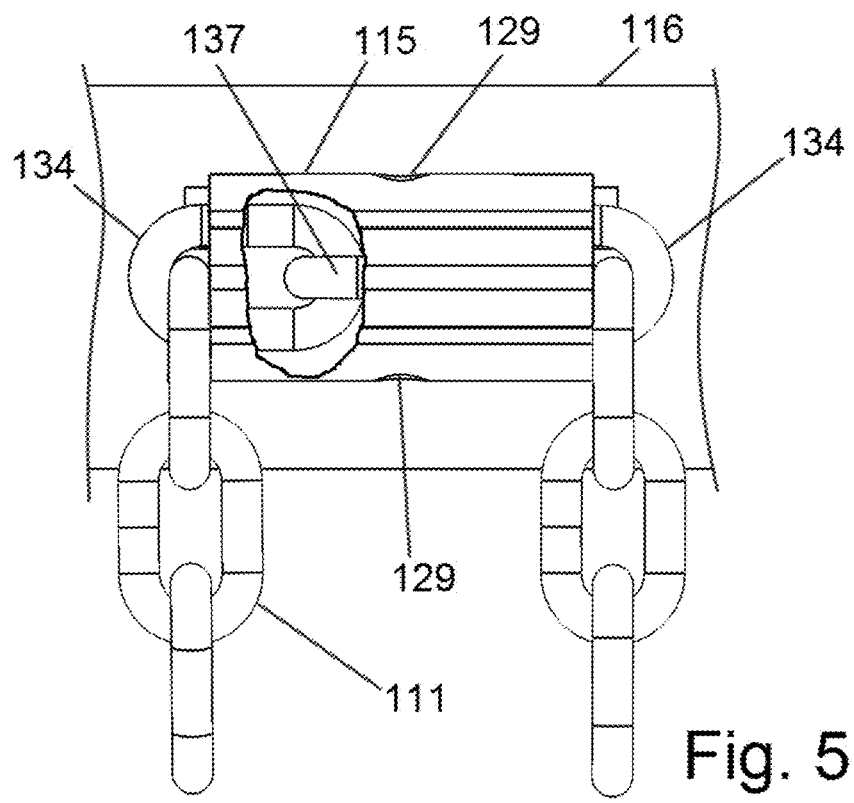
FIG. 5 is a side view of the sleeve mounted to a trailer.
Figure 7:
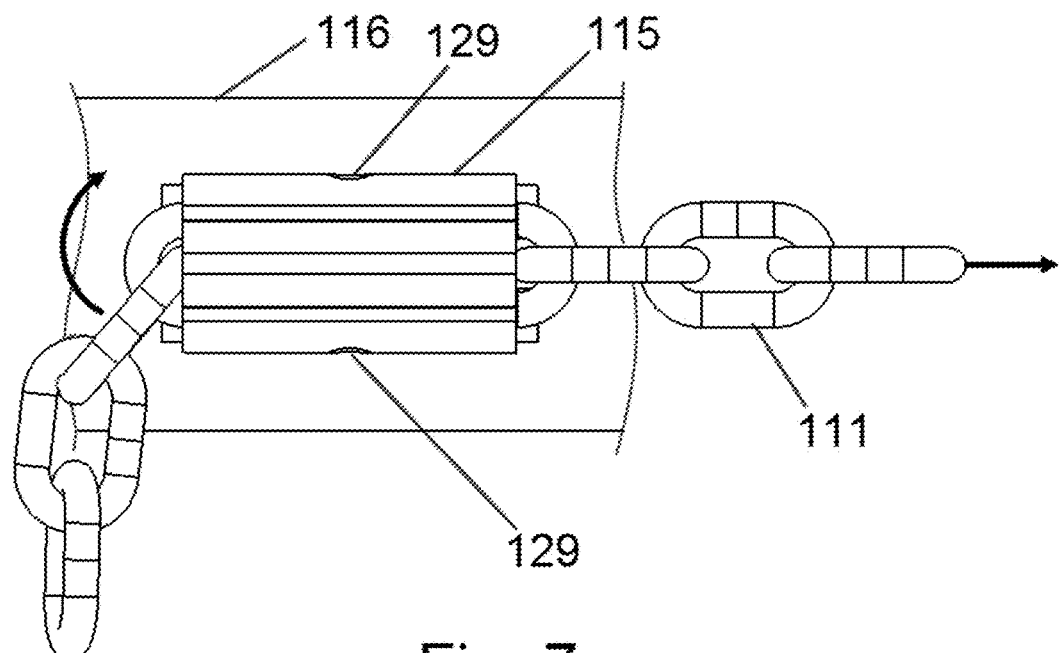
Figure 9:
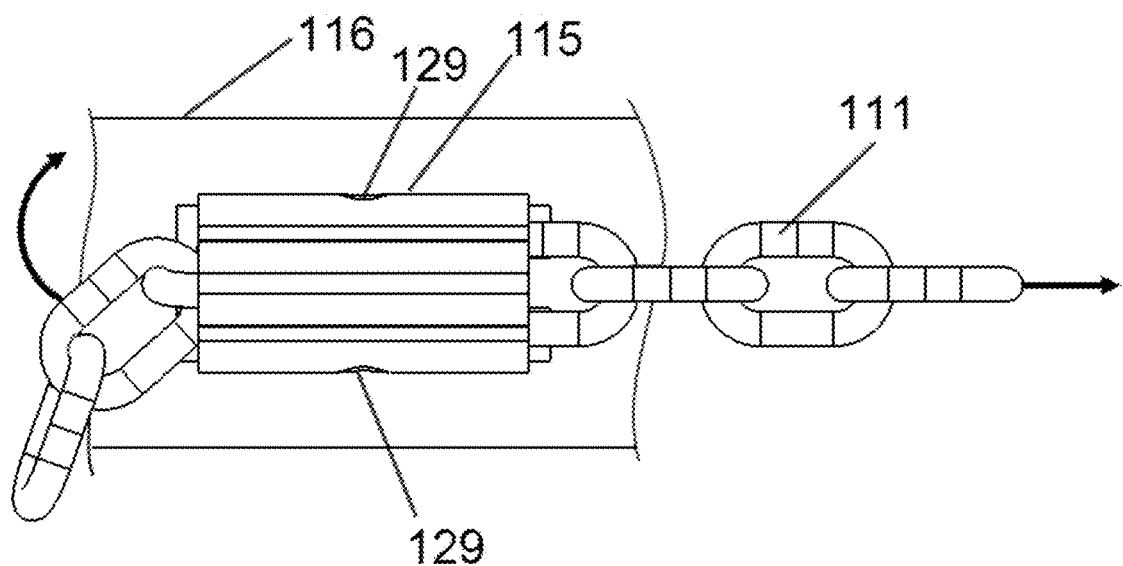

As best shown in FIG. 5, the length of the sleeve 115 assists in longitudinal alignment of the lock link 137 with a sleeve aperture 129 centered longitudinally on the sleeve, as its length is set to be approximately an odd multiple of the chain pitches minus twice the wire diameter of the safety chain 111. The chain hanging down on each side of this length of sleeve 115 will tend to center the lock link 137 in the center of the sleeve and thus in alignment with the sleeve aperture 129 that is in the longitudinal center of the sleeve. With the sleeve 115 at this length, the free parts of the safety chain 111 on each end of the sleeve 115 hang down right near the ends of the sleeve 115. As a result, if a lock link 137 is not centered directly under the sleeve aperture 129, the first link of the chain hanging down on one side or the other will be pulled up at an angle. This is shown in FIG. 7 and FIG. 9. The weight of the chain hanging down from the angled link will pull it down such that the chain inside the sleeve will move the lock link 137 to the proper alignment with sleeve aperture 129 for engagement by the sleeve pin 122. This length of sleeve 115 also helps the user properly align the chain with the sleeve aperture 129 as the user can see just by looking at how the chains are faced at the ends of the sleeve 115 whether a horizontal link 133 is properly oriented under the sleeve aperture 129. As shown in FIG. 5, if the links that are barely protruding out each end are vertical, the lock link 37 will be properly aligned for engagement by the sleeve pin 122. Of course an even number of chain pitches minus two wire diameters could also be used for the approximate length of the sleeve 115 but the sleeve aperture would not be centered longitudinally on the sleeve 115 when the lock link 137 is aligned with the sleeve aperture 129 and the link on one end partially protruding out of the sleeve will be substantially horizontal and the link partially protruding out of the other end will be substantially vertical making it much more confusing as to whether the lock link 137 is properly centered on the sleeve aperture 129 or not.

Figure 6:
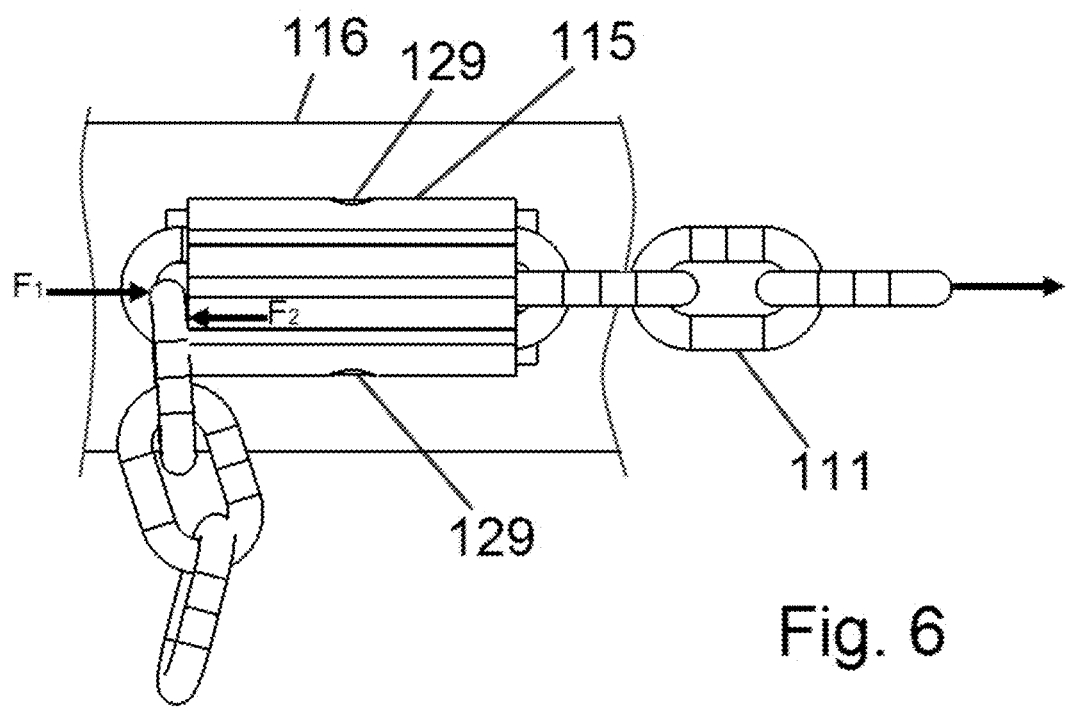
FIGS. 6 through 10 illustrate the progression of the safety chain as it is pulled into the sleeve. Note that the sleeve pin and hook attachments are not shown.
Figure 8:
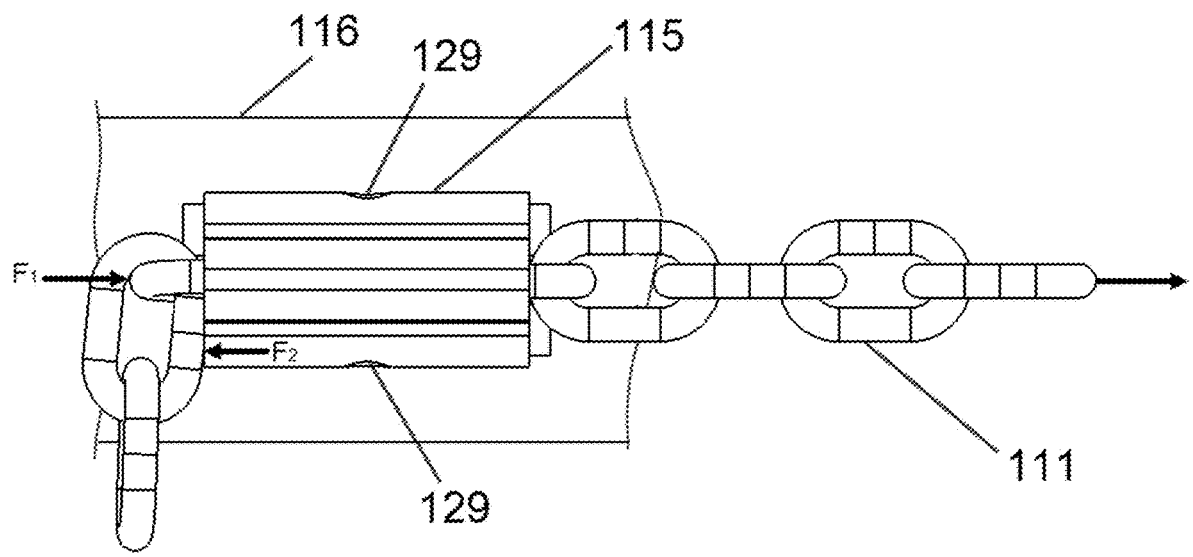
Figure 10:
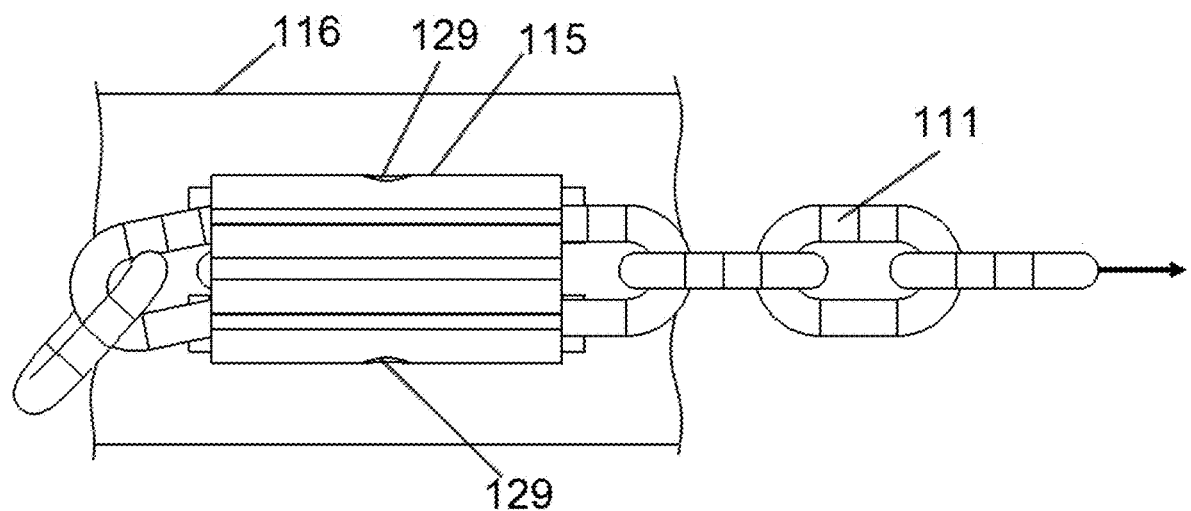
Figure 11:
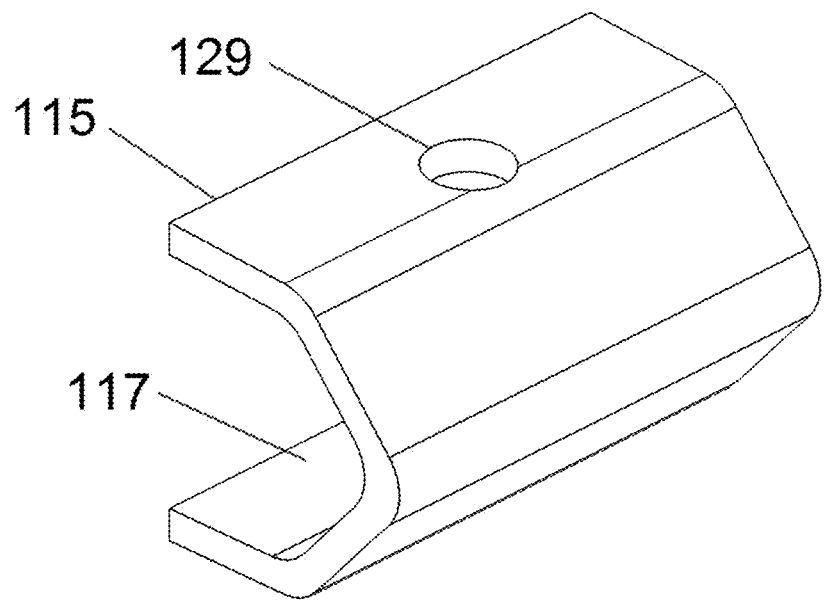
FIGS. 11 though 16 show examples alternate embodiments of a sleeve.
Figure 12:
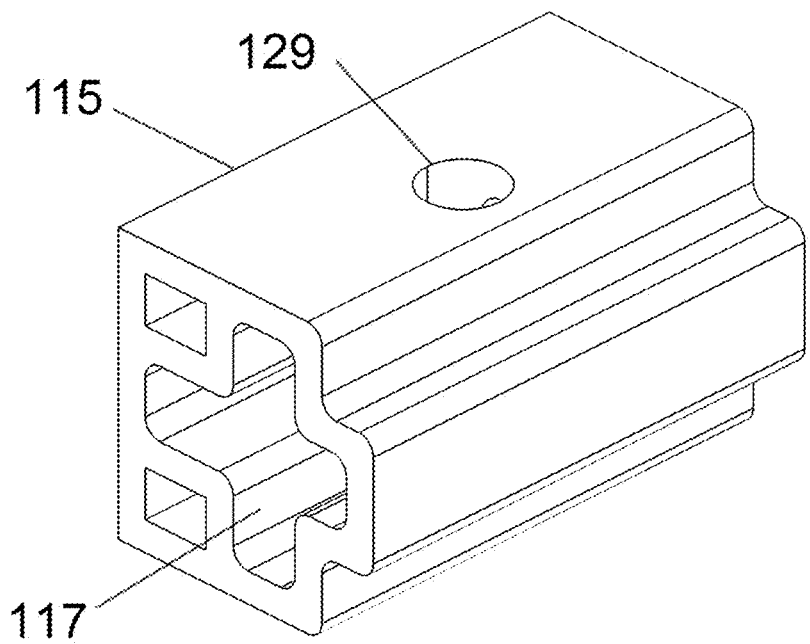
Figure 13:
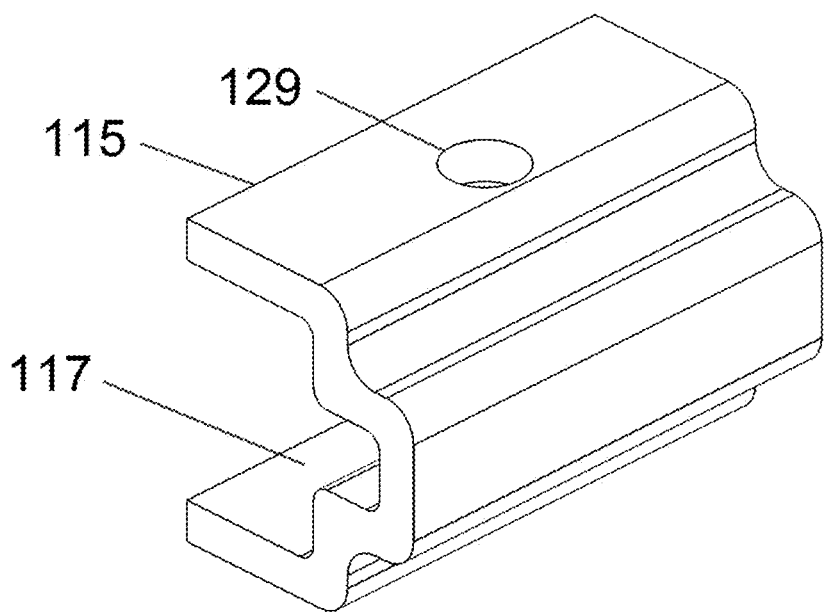
Figure 14:
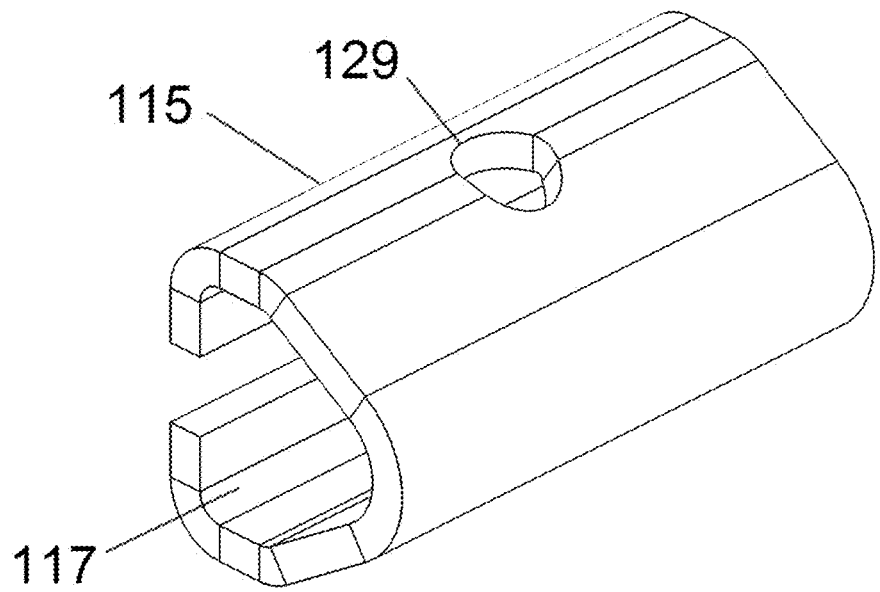
Figure 15:
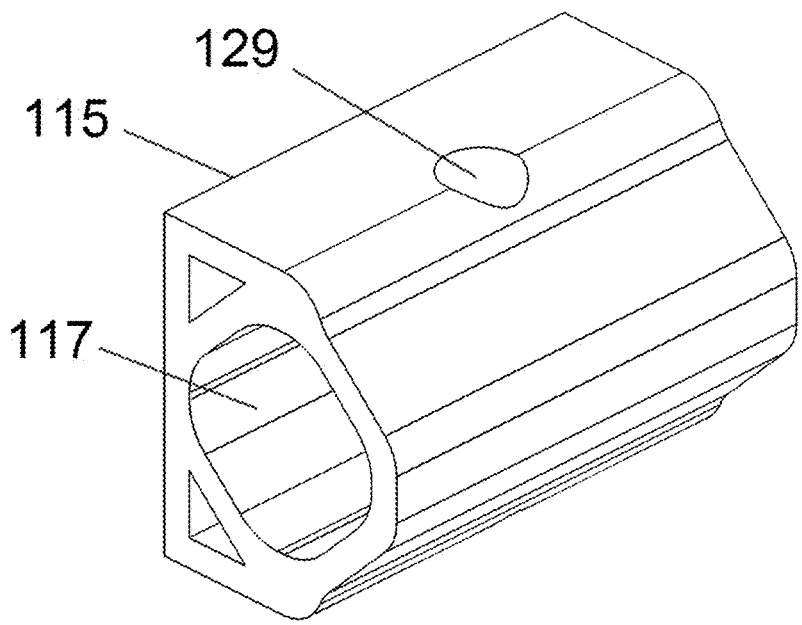
Figure 16:
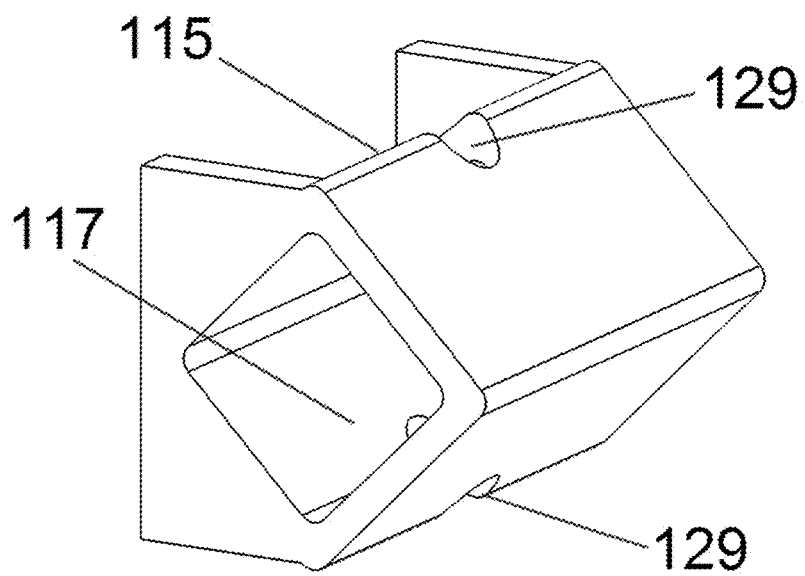

As best shown in FIGS. 6 through 10, the sleeve also urges links of chain that are hanging down on one side or the other of the sleeve to rotate up to be fed into the sleeve when the chain is pulled from the opposite side of the sleeve 115. As shown in FIGS. 6 through 10, when the chain is pulled on one side of the sleeve 115 a force couple F1 and F2 is formed on the link just entering the other side of the sleeve 115, causing the long axis of the link to rotate upward until it is approximately in alignment with sleeve axis and therefore can enter the sleeve 115. FIGS. 6 through 8 show the progression of pulling in a horizontal link 133. FIGS. 8 through 10 show the progression of pulling in a vertical link 134.

In one embodiment, the last link or second to the last link of safety chain 111 is fastened to pin 122 by attaching push nuts 114 on both sides of the chain link. A lanyard 142 with a hairpin cotter pin for securing the sleeve pin 122 in the sleeve 115 may also attach to the sleeve pin 122 in the same manner as the chain. Push nuts are well known in the art. They are designed such that they can slide along a rod in one direction, but their teeth lock onto the rod when they are pushed in the other direction. Thus, one push nut 114 is pushed onto sleeve pin 122 from a first end of the sleeve pin 122 and over the elbow 118. The last link or second to the last link of the safety chain 111 opposite the hook 108 is then put on the pin from the second end of sleeve pin 122. A second push nut 114 is then installed from the second end of pin 122 and pushed up against chain link holding it in place on the sleeve pin 122. These push nuts 114 maintain the connection between the pin 122 and the safety chain 111, so in the unlikely event of the pin 122 not being installed in sleeve 115 to shorten the safety chain, the pin 122 fastened to the last link or second to the last link of the chain 111 will not be able to pass through the cross sectional opening 117 of the sleeve 115 in the event of a primary decoupling and the trailer will remain attached to the tow vehicle. One of ordinary skill will understand that there are many other ways of attaching the pin 122 to the chain 111 such as welding, replacing one or both of the push nuts 114 with a welded washer or an upset as part of the pin 122 itself, etc.

The pin 122 has several features that make it especially convenient to use. The bent elbow 118 is ergonomically designed to allow the user to grasp the upper handle portion of pin 122 with ease and comfort while inserting the lower portion of sleeve pin 122 into the sleeve aperture 129. The angle of bend allows the user to exert a substantial force to insert or withdraw the pin without having to rely solely on the user's grip of the pin. The rounded or chamfered feature 113 on the end of pin 122 shifts the chain one way or the other as it is being inserted into through sleeve aperture 129 allowing the pin 122 to engage the lock link 137 even when the opening in the lock link 137 is not exactly aligned with apertures 129 of the sleeve 115. This additional alignment occurs because the rounded feature 131 of the pin bears on one of the two vertically oriented chain links 134 on either side of the lock link 137 pulling the horizontally oriented chain link into proper position to be engaged by pin 122.

FIGS. 11 through 16 show other embodiments of the sleeve 115. Each of these embodiments have a cross-section that will orient the safety chain 111 links to vertical and horizontal positions like the cross-section shown in FIG. 4.

Figure 17:
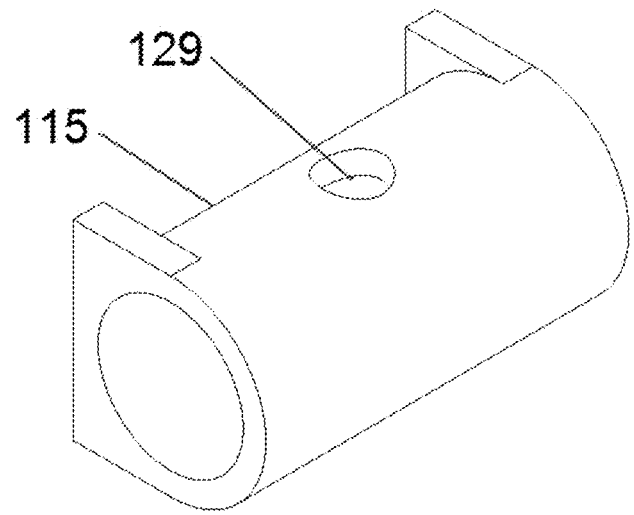
FIG. 17 is an example of an alternate embodiment of the sleeve with no link positioning features in its cross-section.

FIG. 17 is an embodiment of a sleeve 115 whose cross-section being a round tube does not provide any aligning cross section in order to orient the chain links to their horizontal and vertical positions. The proper length as described above, however, does assist in orienting at least one chain link. The inside diameter of the sleeve shown in FIG. 17 is just slightly larger than the chain width. When the length of the sleeve 115 is sized to be approximately an odd multiple of the chain pitch minus two times the chain wire diameter, the extra chain will hang down on both sides of the sleeve 115 as described in connection with FIG. 5 and will orient the links longitudinally inside the sleeve 115. The bottom of vertical links 134 protruding from each end of the sleeve will be urged to the center of the bottom of the round tube due to its shape and the chain pulling down on the link protruding out of each end. The top of the vertical links 134 protruding out of each side of the sleeve will be held from rotating sideways to some degree as they will hit the interior of the round tubular shaped sleeve 115. As the two links protruding out of each end of the tubular sleeve 115 are thus held vertical to a degree as described, they, in turn, will hold the lock link 137 located between them horizontal to a degree in alignment with the sleeve aperture 129. As described for the embodiment shown in FIG. 5, the length could also be an even number of chain pitches minus 2 chain wire diameters, but the same disadvantages of the end links being of different orientation and the sleeve orifice not being in the center of the sleeve would still pertain.

Figure 18:
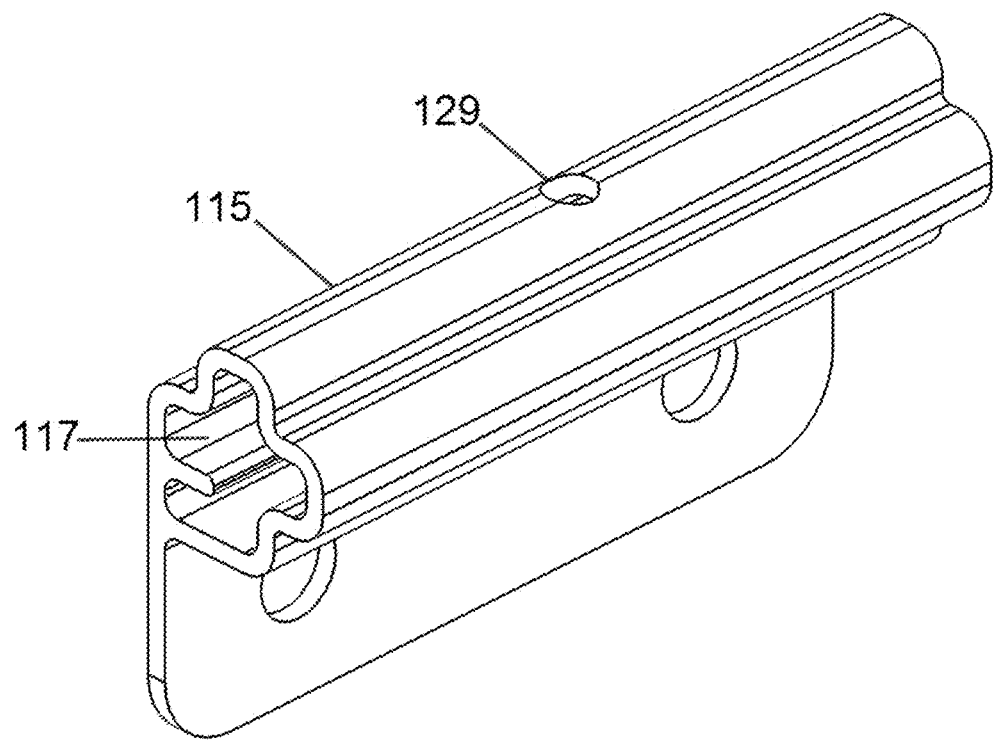
FIG. 18 is an example of an alternate embodiment of the sleeve that may be extruded and also shows mounting holes for bolting or riveting to the trailer tongue.

FIG. 18 is an example of an embodiment that may be extruded and also shows how mounting holes for bolting or riveting the sleeve 115 to the tube 116 of the trailer tongue 121 may be configured.

Figure 19:
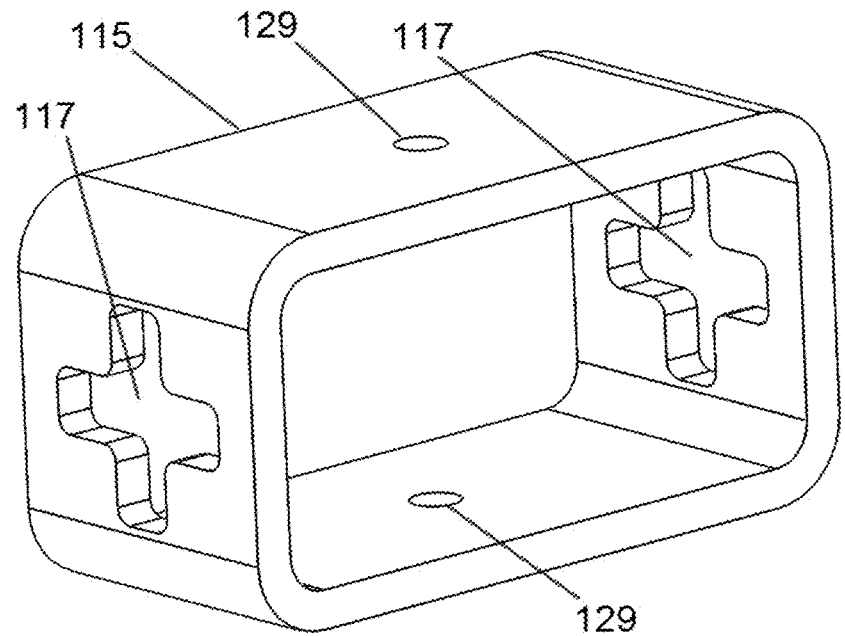
FIG. 19 is an alternate embodiment where the sleeve is not generally tubular in cross-section along its longitudinal axis with the chain orienting feature only at the ends.

While most of the embodiments of the sleeve 115 are generally tubular in shape along their longitudinal axis, FIG. 19 shows an embodiment where the sleeve 115 is not generally tubular in shape along its longitudinal axis. The sleeve opening 131 is one of the primary parts that orient the chain and thus the sleeve may have the chain orienting cross-section only on its ends with a center portion configured to receive the sleeve pin 122.

Figure 20:
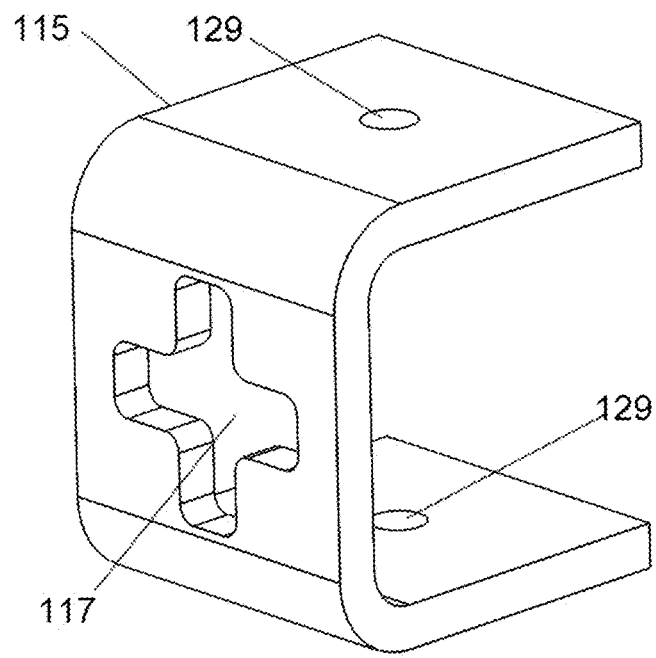
FIG. 20 is similar to the alternate embodiment of FIG. 18 only with a single chain orienting feature.

FIG. 20 is essentially the sleeve embodiment of FIG. 19 with the chain orienting cross-section only on one end. Thus, as shown by FIG. 20, some embodiments of sleeve 115 may only orient one link of safety chain 111. As the user pulls the chain through the sleeve entrance 131, the embodiment shown in FIG. 20 does not necessarily hold the chain in the proper position under the aperture 129 (it can move laterally in the horizontal plane, depending on the direction the operator pulls the chain). While the embodiment of the locking/unlocking mechanism 141 utilizing the sleeve 115 that is depicted in FIG. 20 that is permanently attached to the trailer tongue 121 may not have all the desirable characteristics of other embodiments discussed herein, when utilized with the safety chain 111 received in the cross sectional opening 117 of the sleeve 115 and pin 122 permanently attached proximal one end of the safety chain 111 and a hook 108 permanently attached proximal the other end of the chain, the unlocking/locking mechanism 141 utilizing the sleeve 115 of FIG. 20 would be permanently attached to the trailer yet allow easy and secure changing of the working length of the safety chain.

Figure 21:
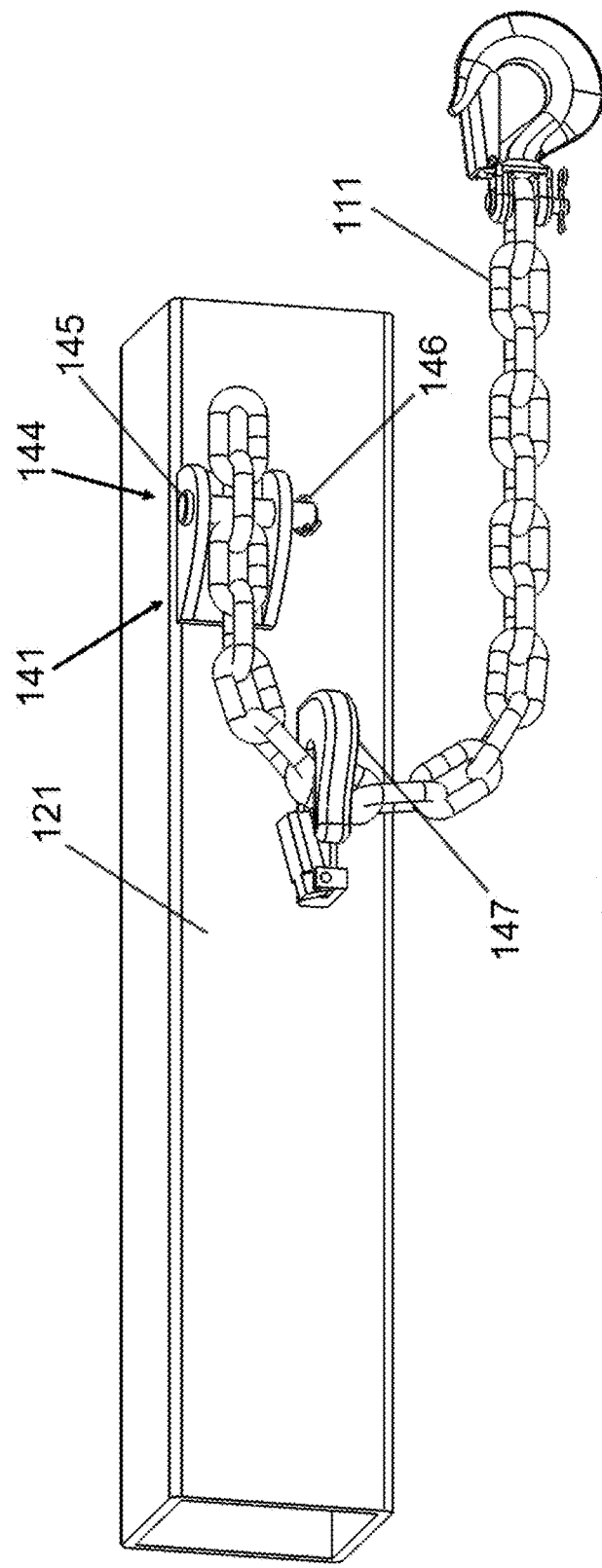
FIG. 21 is an alternate embodiment of the present invention that does not have a chain orienting feature in the chain locking/unlocking mechanism and where one end of the chain is affixed to the trailer frame.

FIG. 21 shows another embodiment of the present invention. In this embodiment, the end of the chain is permanently attached to the trailer with a clevis mount 144. This clevis mount may be of the standard type known to a person of skill in the art which is generally welded or otherwise permanently attached to the trailer tongue 121 and generally attaches to the last link of the safety chain 111 with clevis pin 145 held in the clevis with a bent cotter pin 146. This clevis mount 144 may also take a wider form as shown in FIG. 21 such that it is able to accommodate the width of a link between its side plates, thus allowing the chain to be permanently attached to the trailer with other than the last link. A gated chain hook 147 is also permanently attached to the trailer tongue 121. Changing the working length of the safety chain 111 is accomplished with this embodiment by opening the gate on the gated chain hook 147, removing the safety chain 111 from the slot in the hook 147 and placing a different link of the safety chain in the hook 147 slot. Clevis pin 145 could also be extended similar to sleeve pin 122 to allow for the stacking of extra chain and the hook 108 on an upper portion. Thus, the safety chain is permanently attached to the trailer and yet its working length is easily adjustable.

Figure 22:
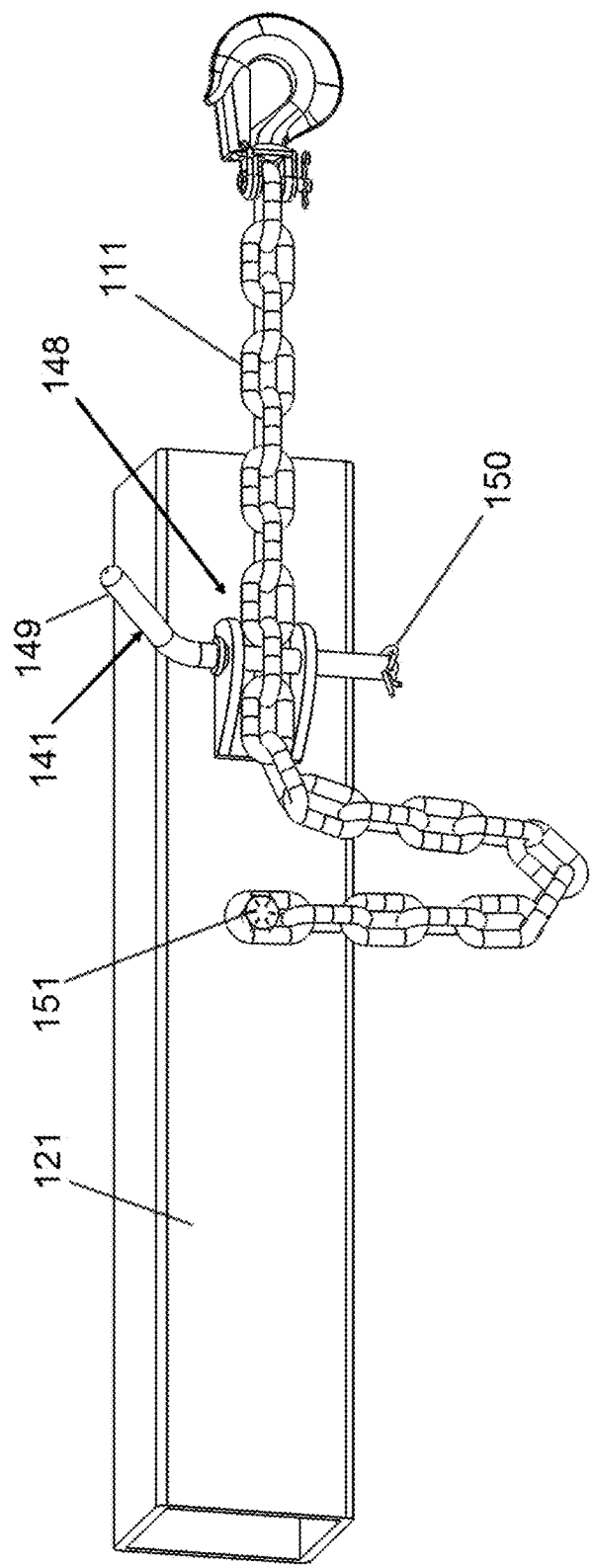
FIG. 22 is another alternate embodiment of the present invention that does not have a chain orienting feature in the locking/unlocking mechanism, where one end of the safety chain is affixed to the trailer frame.

FIG. 22 shows another embodiment of the present invention where the end of the safety chain 111 is permanently attached to the trailer tongue 121 by a bolt 151, rivet, by welding or the like. A clevis mount with a removable pin 149 is used to lock/unlock the safety chain 111 to the trailer tongue 121. The pin 149 could be similar in function and appearance to sleeve pin 122, including a removable hairpin cotter 150 that would keep the pin 149 from inadvertently being removed from the clevis mount 148. Working length adjustment of the safety chain 111 is accomplished by removing the hairpin cotter 150, moving the chain to a different length and reinserting the pin 149 and reinserting the hairpin cotter 150.

Figure 23:
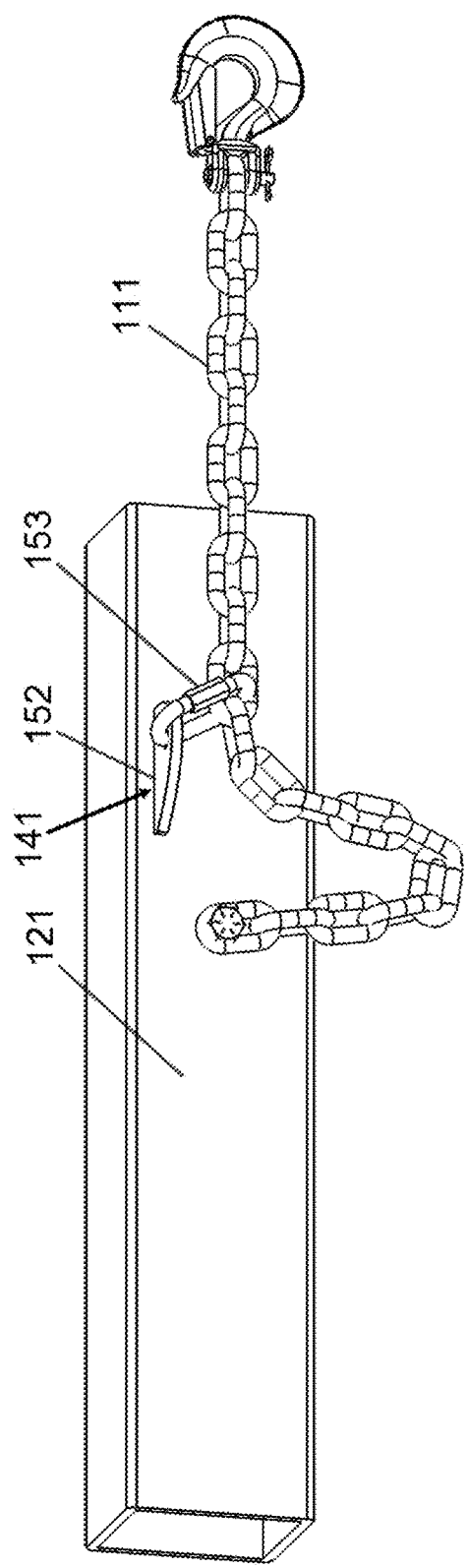
FIG. 23 is another alternate embodiment of the present invention that does not have a chain orienting feature in the locking/unlocking mechanism and where one end of the chain is affixed to the trailer frame.

The embodiment of FIG. 23 is similar to that of FIG. 22 except instead of clevis mount 148 there is an attachment plate 152 with a hole, permanently mounted to the trailer tongue 121. The chain can then be connected to the plate using any number of removable links 153 known to those of skill in the art. The working length of safety chain 111 is changed by detaching the removable link 153 from the chain and connecting it to a different link of the safety chain 111.

Figure 24:
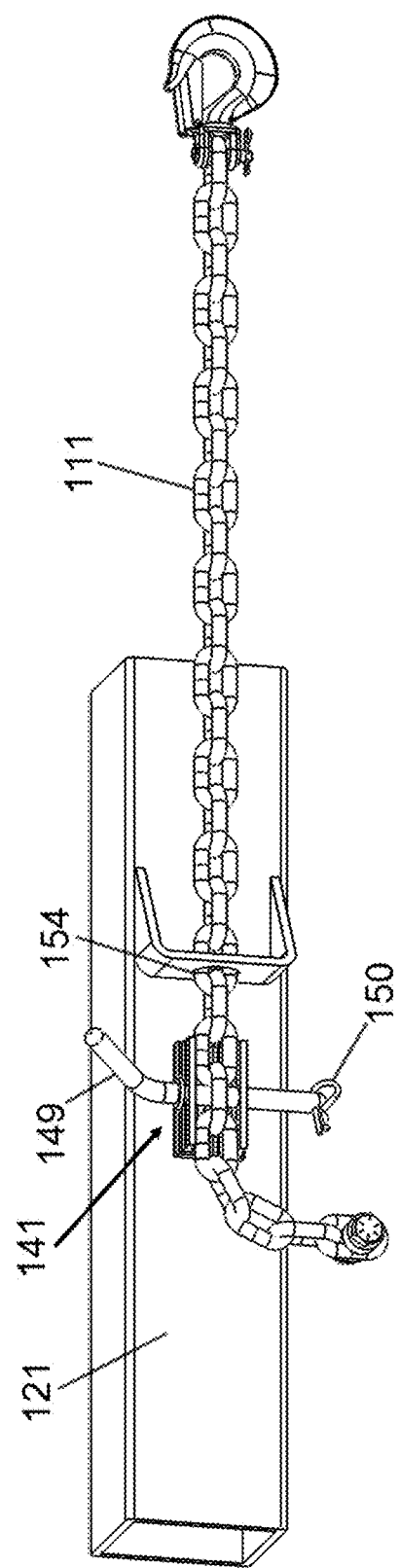
FIG. 24 is another alternate embodiment that does not have a chain orienting feature in the locking/unlocking mechanism and where the chain end is not affixed to the trailer frame, but where the safety chain is still permanently attached to the trailer.

FIG. 24 shows yet another embodiment of the present invention. In this embodiment the chain is permanently attached to the trailer by sliding through an orifice 154 permanently attached to the trailer and a stop being permanently attached proximal each end of the safety chain 111 keeps the chain permanently attached to the trailer similar to that of the embodiment shown in FIGS. 1 through 3. Changing the working length is done as described for the clevis mount 148 in the embodiment shown in FIG. 21.

It will be obvious to those having ordinary skill in the art that changes and modifications may be made thereto without departing from the scope and the spirit of the invention as hereinafter claimed.

What is claimed is:

1. A system for attaching a safety chain between a tow vehicle and a trailer, said system comprising:
a first safety chain permanently attached to the trailer, said first safety chain having first and second ends which are interconnected by interlocking chain links, said first end including a releasable attachment for attaching said first end to the tow vehicle; and
a first locking/unlocking mechanism permanently attached to the trailer that releasably locks said first safety chain to provided a desired working length of said first safety chain, where the working length is measured between said first locking/unlocking mechanism and said first end.

2. The system of claim 1, wherein said first locking/unlocking mechanism comprises:
a first sleeve having both a longitudinal aperture with a first longitudinal axis and a transverse aperture with a first transverse axis, said first transverse axis being substantially perpendicular to said first longitudinal axis, said first sleeve slidably encompassing a portion of said first safety chain;
a first pin insertable into said first transverse aperture so that it passes into a chain link in said encompassed portion of said first safety chain so that said first safety chain is locked to said first sleeve.

3. The system of claim 2, wherein said first pin has upper and lower portions, with said upper and lower portions being interconnected by a bend which forms an angle of between about 10 degrees and 70 degrees between said upper and lower portions.

4. The system of claim 3 wherein said releasable attachment is sized to engage said upper portion of said first pin, thereby providing a convenient storage location for said releasable attachment when it is not attached to a tow vehicle.

5. The system of claim 2, wherein:
said first pin is permanently attached to said first safety chain proximate said second end;
said pin is sized such that it prevents said second end from passing through said first longitudinal aperture; and
said releasable attachment is sized such that it prevents said first end from passing through said first longitudinal aperture, whereby said pin and said releasable attachment trap said first safety chain within said sleeve so that said first safety chain is permanently attached to the trailer.

6. The system of claim 5, wherein said first pin passes through a chain link proximate said second end that is not a terminal link of said second end.

7. The system of claim 2, wherein said first sleeve has a longitudinal length substantially equal to an odd chain pitch multiple minus two chain link wire diameters, so that the portion of said first safety chain hanging down from either end of said first sleeve will urge the opening of a link of said first safety chain inside the sleeve to substantially longitudinally align with said first transverse axis.

8. The system of claim 7, wherein an interior of said first sleeve is shaped to substantially restrain a rotation around said first longitudinal axis of at least one link of said first safety chain within said first sleeve, such that said link opening is held substantially perpendicular to said first transverse axis.

9. The system of claim 2, which further comprises a retainer engagable with said first pin to prevent said first pin from pulling out of said first transverse aperture.

10. The system of claim 2, wherein an interior of said first sleeve is shaped to substantially restrain a rotation of said encompassed portion within said first sleeve so that the chain link, though which said first pin passes, remains substantially perpendicular to said first transverse axis.

11. The system of claim 1 wherein said first safety chain is permanently affixed to said trailer proximate said second end.

12. The system of claim 1 further comprising:
a first slider attachment permanently attached to the trailer;
wherein said first safety chain slidably engaged to said first slider attachment for allowing the first safety chain to slide in a first direction and a second opposing direction,
said first safety chain having first and second stops permanently attached proximate said first and second ends, respectively; and
wherein said first safety chain can slide within said first slider attachment, but cannot be pulled out of said first slider attachment because it is locked in by said first and second stops.

13. The system of claim 1, which further comprises:
a tongue attached to a forward end of said trailer;
a coupler attached to a forward end of said tongue, said coupler enabling said trailer to be coupled to said tow vehicle; and
wherein said locking/unlocking mechanism is positioned on said forward end of said trailer such that said first safety chain can be locked in said locking/unlocking mechanism and thereby provide said desired working length that enables said releasable attachment to be attached to the tow vehicle when the coupler is coupled to the tow vehicle, but is sufficiently short that said first safety chain will prevent the trailer tongue from contacting a ground when said coupler becomes uncoupled from the tow vehicle.

14. The system of claim 1, wherein said first locking/unlocking mechanism comprises:
a first plate attached to the trailer having an aperture there through, such aperture having an aperture axis; and
a first attaching member which secures a link of said first safety chain to the aperture, thereby locking said first safety chain to said first plate.

15. The system of claim 14, wherein said first safety chain is permanently affixed, proximate said second end, to said trailer.

16. A method for attaching a safety chain between a tow vehicle and a trailer, said method comprising the steps of:
providing a first safety chain having first and second ends;
permanently attaching said first safety chain to the trailer;
providing a first locking/unlocking mechanism and attaching said first locking/unlocking mechanism to the trailer, said first locking/unlocking mechanism operative on said first safety chain to set a desired working length of chain, the chain working length being measured between said first locking/unlocking mechanism and said first end; and
attaching said first end of said first safety chain to the tow vehicle.

17. The method of claim 16, which further comprises the steps of:
equipping said first locking/unlocking mechanism with a first sleeve having a first longitudinal aperture with a first longitudinal axis;
said first sleeve having a first transverse aperture having a first transverse axis;
said first transverse axis being substantially perpendicular to the first longitudinal axis;
slidably inserting said first safety chain within said first sleeve; and
locking the first safety chain to the first sleeve by inserting a first pin into the first transverse aperture and into a link opening of said first safety chain.

18. The method of claim 16, which further comprises the step of permanently affixing said first safety chain to said trailer proximate said second end.

19. The method of claim 16, which further comprises the steps of:
permanently attaching a first slider attachment to the trailer;
slidably engaging said first safety chain with said first slider attachment, allowing the chain to slide in a first direction and a second opposing direction; and
permanently attaching first and second stops proximal first and second ends respectively to said first safety chain;
wherein said first stop restrains sliding of said first safety chain in said first direction; and
said second stop restrains sliding of said first safety chain in a second direction.

20. The method of claim 16, which further comprises the steps of:
providing a second safety chain having third and fourth ends;
permanently attaching said second safety chain to the trailer;
providing a second locking/unlocking mechanism and attaching said second locking/unlocking mechanism to the trailer, said second locking/unlocking mechanism operative on said second safety chain to set a desired length of chain between said second locking/unlocking mechanism and said third end of said second safety chain; and
attaching said third end of said second safety chain to the tow vehicle.

21. The method of claim 20, which further comprises the steps of:
equipping said first locking/unlocking mechanism with a first sleeve having both a first longitudinal aperture with a longitudinal axis and a first transverse aperture with a first transverse axis, said first transverse axis being substantially perpendicular to the first longitudinal axis;
slidably inserting said first safety chain within said first sleeve;
locking the first safety chain to the first sleeve by inserting a first pin into the first transverse aperture and into a link opening of said first safety chain;
equipping said second locking/unlocking mechanism with a second sleeve having both a second longitudinal aperture with a second longitudinal axis and a second transverse aperture with a second transverse axis, said second transverse axis being substantially perpendicular to the second longitudinal axis;
slidably inserting said second safety chain within said second sleeve; and
locking the second safety chain at a preferred length to the second sleeve by inserting a second pin into the second transverse aperture and into a link opening of said second safety chain.

22. The method of claim 21, which further comprises the steps of:
setting said desired lengths of said first and second safety chains such that a front of the trailer will not hit a ground should a primary coupling between the tow vehicle and trailer fail.

23. The method of claim 20, which further comprises the steps of:
crossing said first end of said first safety chain under the trailer tongue before attaching it to the tow vehicle; and
crossing said third end of said second safety chain under the trailer tongue before attaching it to the tow vehicle.

* * * * *